(12) United States Patent
Hosoki

(10) Patent No.: US 9,383,506 B2
(45) Date of Patent: Jul. 5, 2016

(54) LIGHTING DEVICE, DISPLAY DEVICE, AND TELEVISION DEVICE

(71) Applicant: Sharp Kabushiki Kaisha, Osaka-shi, Osaka (JP)

(72) Inventor: Mitsuru Hosoki, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 14/418,458

(22) PCT Filed: Aug. 14, 2013

(86) PCT No.: PCT/JP2013/071908
§ 371 (c)(1),
(2) Date: Jan. 30, 2015

(87) PCT Pub. No.: WO2014/030584
PCT Pub. Date: Feb. 27, 2014

(65) Prior Publication Data
US 2015/0192729 A1     Jul. 9, 2015

(30) Foreign Application Priority Data
Aug. 21, 2012 (JP) .................................. 2012-182289

(51) Int. Cl.
*G02F 1/13357*     (2006.01)
*F21V 8/00*     (2006.01)
(Continued)

(52) U.S. Cl.
CPC ............ *G02B 6/0085* (2013.01); *G02B 6/0073* (2013.01); *G02B 6/0091* (2013.01); *G02F 1/133308* (2013.01); *G02F 1/133385* (2013.01);
(Continued)

(58) Field of Classification Search
CPC .......... G02F 1/133385; G02F 2201/36; G02F 1/133308; G02B 6/0085
See application file for complete search history.

(56) References Cited

U.S. PATENT DOCUMENTS

| 2007/0081344 A1* | 4/2007 | Cappaert | G02B 6/0085 362/373 |
| 2008/0089028 A1* | 4/2008 | Kim | G02F 1/133608 361/695 |
| 2008/0129920 A1* | 6/2008 | Ito | G02F 1/133308 349/60 |

(Continued)

FOREIGN PATENT DOCUMENTS

| CN | 2431112 Y | 5/2001 |
| CN | 101308269 A | 11/2008 |

(Continued)

*Primary Examiner* — Julie Bannan
(74) *Attorney, Agent, or Firm* — Keating & Bennett, LLP

(57) ABSTRACT

A backlight unit 12 includes a chassis 14, an LED 17, a light guide plate 19, a duct member 22, and dissipative LED attachment portion 30. The chassis 14 includes a light exit portion 14c through which light exits. The LED 17 is arranged close to an end portion of the chassis 14. The light guide plate 19 is arranged closer to a middle area of the chassis 14 than the LED 17 and light from the LED 17 is guided toward the light exit portion 14c thereby. The duct member 22 is arranged on the side opposite to the light exit portion 14c side of the chassis 14 and has an air passage 23 therein. The duct member 22 is formed of a composite plate 37 including a resin core 38 having a plate-like shape and a pair of metal plates 39 and 40 arranged so as to sandwich the resin core 38 from a front side and a rear side. The dissipative LED attachment portion 30 is provided to the duct member 22 and includes one part facing the air passage 23 and another part protruding to inside of the chassis 14 and to which the LED 17 is attached.

12 Claims, 26 Drawing Sheets

(51) Int. Cl.
*G02F 1/1333* (2006.01)
*H04N 5/655* (2006.01)

(52) U.S. Cl.
CPC .... *H04N 5/655* (2013.01); *G02F 2001/133314* (2013.01); *G02F 2201/36* (2013.01)

(56) References Cited

U.S. PATENT DOCUMENTS

2008/0165496 A1* 7/2008 Kang ............... G02F 1/133308
361/692
2008/0285290 A1* 11/2008 Ohashi ................ G02B 6/0085
362/373
2009/0046212 A1 2/2009 Tsubata et al.
2009/0122218 A1* 5/2009 Oh .................... G02F 1/133385
361/679.21
2012/0092562 A1 4/2012 Omiya et al.

FOREIGN PATENT DOCUMENTS

| | | |
|---|---|---|
| CN | 101351743 A | 1/2009 |
| CN | 102459997 A | 5/2012 |
| JP | 2006-059607 A | 3/2006 |

* cited by examiner

FIG.1
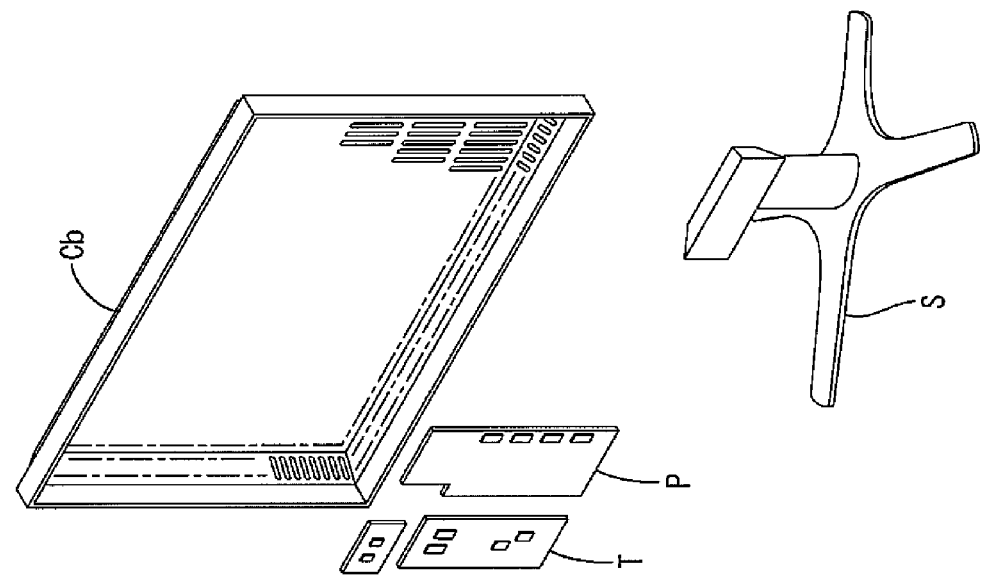
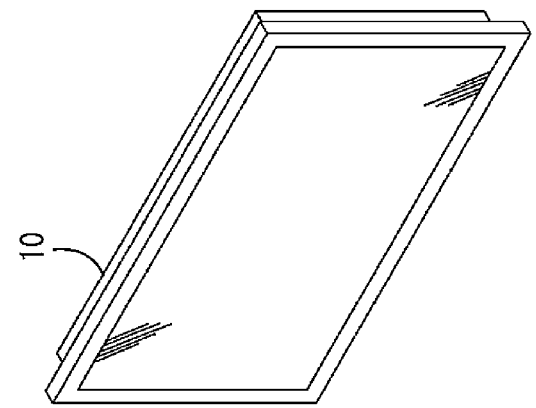
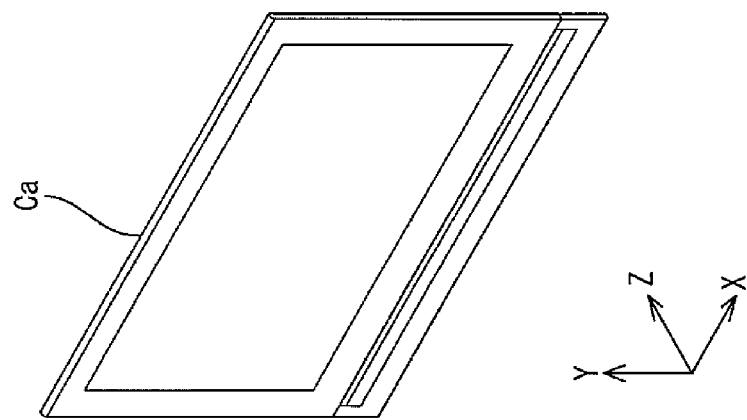

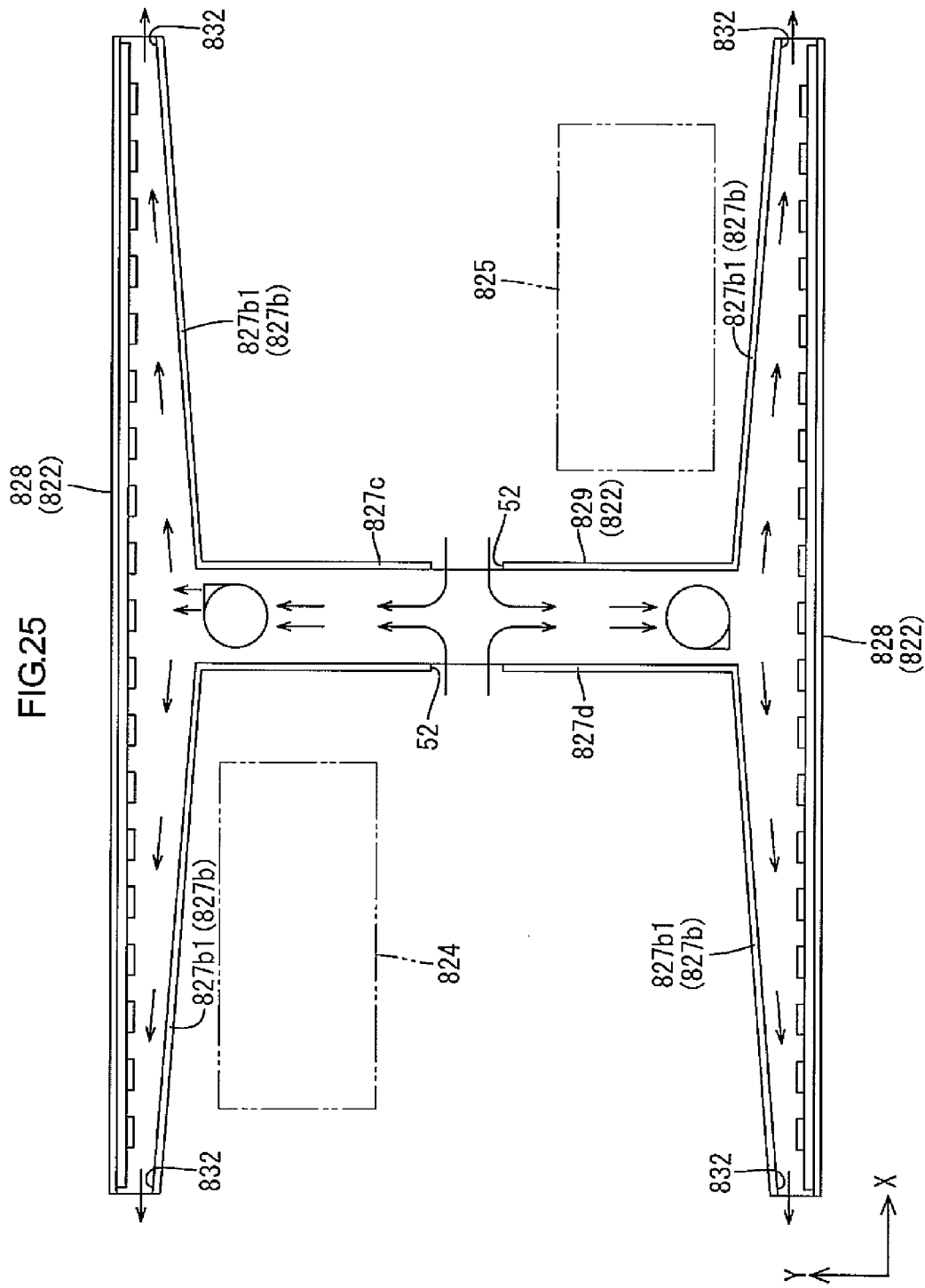

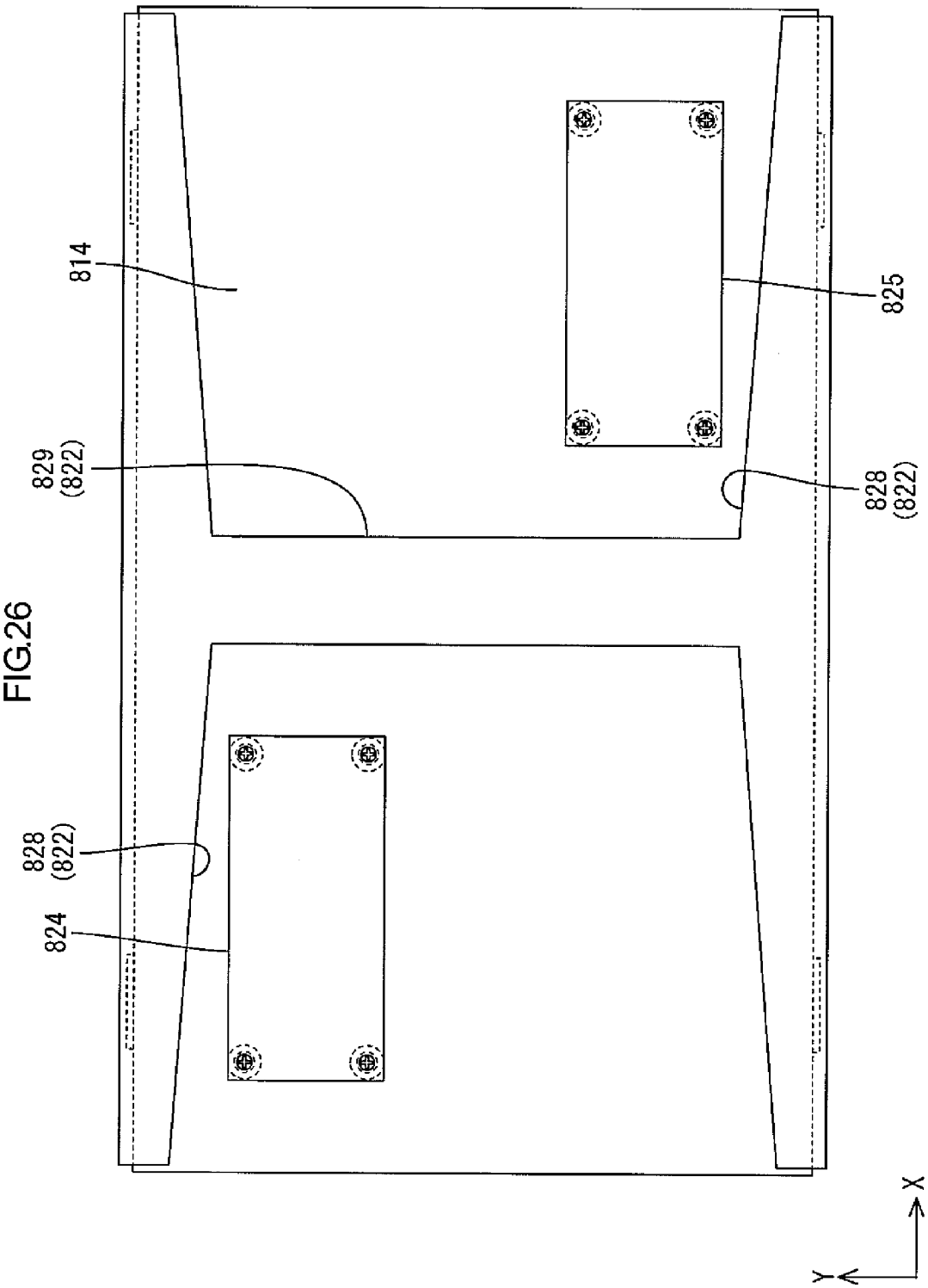

LIGHTING DEVICE, DISPLAY DEVICE, AND TELEVISION DEVICE

TECHNICAL FIELD

The present invention relates to a lighting device, a display device, and a television device.

BACKGROUND ART

A liquid crystal panel used for a liquid crystal display device such as a liquid crystal television does not emit light, and thus a backlight unit is required as a separate lighting device. The backlight unit is arranged on a back side (a side opposite to a display surface) of the liquid crystal panel. The backlight unit includes a chassis, a light source, a reflection sheet, and an optical member (a diffuser sheet). The chassis has an opening on a liquid crystal panel side. The light source is arranged in the chassis. The reflection sheet is disposed in the chassis and configured to reflect light toward the opening of the chassis. The optical member is arranged at the opening of the chassis and configured to efficiently direct light emitted from the light source toward the liquid crystal panel. One example of such a backlight unit is disclosed in Patent Document 1.

RELATED ART DOCUMENT

Patent Document

Patent Document 1: Japanese Unexamined Patent Publication No. 2006-59607

Problem to be Solved by the Invention

Patent Document 1 discloses a technology of effective heat dissipation for a direct-type backlight unit in which light sources are arranged right behind a liquid crystal panel. On the other hand, in an edge-light backlight unit, light sources are arranged concentrated at an end portion of the backlight unit and light from the light sources is directed toward a light exit side by a light guide plate. Since the light sources are arranged concentrated at the end portion of the edge-light backlight unit, heat is more likely to stay in the end portion. Therefore, sufficient heat dissipation performance may not be obtained by merely applying heat dissipation structure in Patent Document 1 to the edge-light backlight unit. Thus, a demand for higher heat dissipation performance has been raised.

DISCLOSURE OF THE PRESENT INVENTION

The present invention was made in view of the above reasons and an object of this invention is to improve heat dissipation properties.

Means for Solving the Problem

A lighting device according to this invention includes a chassis, a light source, a light guide member, a duct member, and a dissipative light source attachment portion. The chassis includes a light exit portion through which light exits. The light source is arranged close to an end portion of the chassis. The light guide member is arranged closer to a middle area of the chassis than the light source is and configured to guide light from the light source toward a light exit portion side. The duct member is arranged on a side of the chassis opposite to the light exit portion side and has an air passage therein. The duct member is formed of a composite plate including a plate-like resin core and a pair of metal plates. The pair of the metal plates sandwich the resin core from a front side and a rear side. The dissipative light source attachment portion is provided to the duct member. One part of the dissipative light source attachment portion faces the air passage and another part thereof protrudes inside of the chassis. The light source is attached to the other part of the dissipative light source attachment portion.

In this configuration, the other part of the dissipative light source attachment portion protrudes to the space within the chassis, and the light source that is attached to the other part is located close to the end portion of the chassis. Light emitted from the light source is directed toward the light exit portion side of the chassis by the light guide member that is arranged in the inner area of the chassis from the light source. Heat generated by emission of light from the light source is transferred to the one part of the dissipative light source attachment portion that faces the air passage of the duct member, and thus the heat is efficiently dissipated through air that flows through the air passage. With this configuration, even in the lighting device in which the light source is arranged close to the end portion of the chassis and heat is more likely to stay the end portion, heat dissipation properties remain high. Therefore, brightness of exiting light may be easily enhanced by increasing output of the light source.

The duct member is formed of a composite plate including a resin core having a plate-like shape and a pair of metal plates arranged so as to sandwich the resin core from a front side and a rear side. According to this configuration, the duct member formed of the composite plate is reduced in weight compared to a duct member that is a metal plate. Specifically, compared to a duct member a metal plate, the duct member formed of the composite plate and having a thickness or mechanical strength substantially same as the duct member made of the composite plate is lighter in weight due to the resin core included in the composite plate. Accordingly, heat dissipative properties of the lighting device are improved without increasing the weight.

The following configurations are preferable as aspects of this invention.

(1) The duct member may include a bottom wall and at least a pair of sidewalls. The bottom wall may be opposite the chassis. The sidewalls may protrude from the bottom wall toward the chassis and face each other. The bottom wall, the at least a pair of sidewalls, and the chassis may define the air passage that is a space surrounded thereby. With this configuration, the chassis can be reinforced by the duct member including the bottom wall and the pair of sidewalls that define the air passage together with the chassis. Therefore, the plate thickness of the chassis may be decreased or a material that effectively reduces the weight may be used for the chassis 14 even if such a material has relatively lower strength than a metal plate. Accordingly, the lighting device is further reduced in weight.

(2) The chassis may be formed of a light reflecting plate that is made of synthetic resin and includes a surface having a white color. According to this configuration, light traveling through the light guide member is efficiently reflected toward the light exit portion by the chassis and thus high light use efficiency is achieved. Compared to a configuration in which a reflection sheet is provided separately from the chassis for reflecting light that propagates through the light guide member, the number of components and assembling steps can be reduced. Further, this configuration is preferable to reduce the weight and the thickness of the chassis.

(3) The chassis may be formed of the light reflecting member made of a foamed resin material. According to this configuration, the weight and the thickness of the chassis are further reduced. Further, light reflectivity is effectively improved.

(4) The chassis may be formed of a composite plate including a resin core having a plate-like shape and a pair of metal plates arranged so as to sandwich the resin core from a front side and a rear side. According to this configuration, the chassis is lighter in weight compared to a chassis made of a metal plate. Further, the composite plate of the chassis has high heat insulation properties. Therefore, even if heat that is transferred from the light source to the duct member propagates to the chassis, the heat is less likely to propagate to the light guide member. Thus, a temperature of the light guide member is less likely to be increased due to heat from the light source.

(5) The duct member may cover a part of the chassis. The lighting device may further include a light source drive board attached to the chassis. The light source drive board is located on the side of the chassis that is opposite to the light exit portion side and adjacent to the duct member. The light source drive board may be configured to provide drive power to the light source. In this configuration, the light source drive board is located on the side of the chassis opposite to the light exit portion side and adjacent to the duct member. Therefore, a thickness of the lighting device can be reduced compared with a case in which the light source drive board is attached to a surface of the duct member opposite to a chassis side. Further, the chassis is formed of a composite plate having high thermal insulation properties. According to this configuration, heat generated from the light source drive board mounted on the chassis is less likely to be transferred to the light guide member via the chassis. Therefore, a temperature of the light guide member is less likely to be increased due to heat from the light source drive board.

(6) The lighting device may further include a blower mounted to the duct member. The blower may have a blowing port that faces a part of the dissipative light source attachment portion. Air flows to the air passage through the blowing port. With this configuration, the air passing through the blowing port of the blower toward the air passage efficiently hits a part of the dissipative light source attachment portion opposite thereto, and thus heat from the light source is efficiently dissipated.

(7) The lighting device may further include a thermal conductive member that is arranged between the light source and the dissipative light source attachment portion and has relatively higher thermal conductivity than the duct member. With this configuration, heat from the light source is effectively transferred to the dissipative light source attachment portion and thus heat dissipation performance is further improved. In a configuration having high heat dissipation performance, small and light-weight fans can be used as the fans. Accordingly, overall weight of the backlight unit can be reduced.

(8) The thermal conductive member extends to the one part of the dissipative light source attachment portion that faces the air passage. In this configuration, heat transferred from the light source to the thermal conductive member is transferred to the dissipative light source attachment portion. Further, the heat is dissipated from the part of the dissipative light source attachment portion that faces the air passage in air that flows through the air passage. Accordingly, heat dissipation performance is further improved.

Next, to solve the above problem, a display device according to this invention may include the above-described lighting device and a display panel configured to provide display using light from the lighting device.

According to such a display device, the lighting device that provides light to the display panel can have improved heat dissipation properties. Therefore, brightness of light emission can be improved by increasing output of the light sources. Accordingly, high quality display can be achieved.

The display panel may be a liquid crystal panel. The display device as a liquid crystal display device has a variety of applications, such as a television display or a personal-computer display. In particular, it is suitable for a large screen display.

Advantageous Effect of the Invention

According to this invention, heat dissipation properties can be improved.

BRIEF DESCRIPTION OF THE DRAWINGS

FIG. 1 is an exploded perspective view illustrating a general configuration of a television device according to a first embodiment of this invention.

FIG. 25 is a plan view illustrating an arrangement configuration of a duct member, LED boards, and fans according to a ninth embodiment of this invention.

FIG. 26 is a bottom view illustrating an arrangement configuration of a chassis, a duct member, and boards.

MODE FOR CARRYING OUT THE INVENTION

First Embodiment

A first embodiment of this invention will be described with reference to FIGS. 1 to 10. In this description, a liquid crystal display device 10 will be described. X-axis, Y-axis and Z-axis are present in some drawings. The axes in each drawing correspond to the respective axes in other drawings. Upper sides and lower sides in FIGS. 6 and 7 correspond to a front side and a rear side, respectively.

Figure 2:
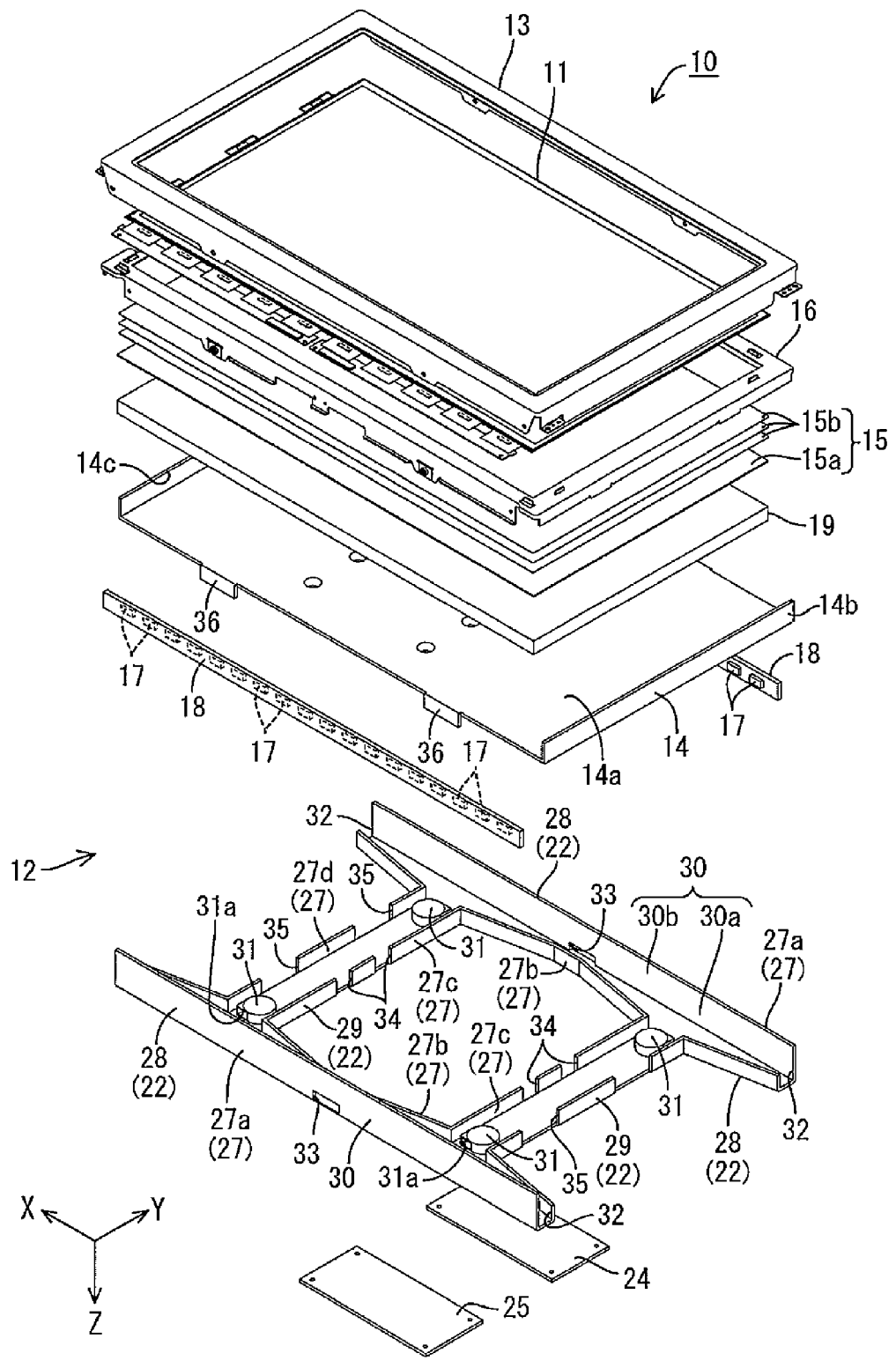
FIG. 2 is an exploded perspective view illustrating a general configuration of a liquid crystal display device.

As illustrated in FIG. 1, a television device TV includes the liquid crystal display device 10, front and rear cabinets Ca and Cb that hold the liquid crystal display device 10 therebetween, a power source P, a tuner T, and a stand S. An overall shape of the liquid crystal display device (a display device) 10 is a landscape rectangular. The liquid crystal display device 10 is held in a vertical position. As illustrated in FIG. 2, the liquid crystal display device 10 includes a liquid crystal panel 11 as a display panel and a backlight unit (a lighting device) 12. The liquid crystal panel 11 and the backlight unit 12 are held with a bezel 13 having a frame-like shape.

As illustrated in FIG. 2, the liquid crystal panel has a landscape rectangular shape (rectangular and longitudinal) in a plan view and includes a pair of glass substrates 11a and 11b and liquid crystals. The substrates 11a and 11b each having high light transmissivity are bonded together with a predetermined gap therebetween. The liquid crystals are sealed between the substrates 11a and 11b. On one of the substrates, switching components (e.g., TFTs), pixel electrodes, and an alignment film are arranged. The switching components are connected to source lines and gate lines that are perpendicular to each other. The pixel electrodes are connected to the switching components. On the other substrate, a color filter, counter electrodes, and an alignment film are arranged. The color filter has color sections such as R (red), G (green) and B (blue) color sections that are arranged in a predetermined pattern. Polarizing plates are arranged on outer sides of the substrates.

As illustrated in FIG. 2, the backlight unit 12 includes a chassis 14 and an optical member 15. The chassis 14 has a light exit portion 14c that opens to the front side (a light exit side, a liquid crystal panel 11 side). The optical member 15 covers the light exit portion 14c. The chassis 14 holds LEDs (Light Emitting Diodes) 17 as light sources, LED boards 18 on each which the LEDs 17 are mounted, a light guide plate (a light guide member) 19, and a frame (a holding member) 16. The light guide plate 19 is configured to guide light from the LEDs 17 toward the front side, i.e., toward a light exit portion 14c side (an optical member 15 side, the liquid crystal panel 11 side). The frame 16 presses the light guide plate 19 and the optical member 15 from the front side. A duct member 22, an LED drive board (a light source drive board) 24, and a control board 25 are attached on a rear side outer portion of the chassis 14. The duct member 22 has an air passage (air through path, air blowing paths) 23 to dissipate heat from the LEDs 17. The LED drive board 24 is configured to supply driving power to the LEDs 17. The control board 25 is configured to send signals to the liquid crystal panel 11 to drive liquid crystals. The backlight unit 12 is an edge-type backlight unit (or side-light type) and includes the LED boards 18 and the light guide plate 19. Each of the LED boards 18 having the LEDs 17 is disposed in each long-side end portion of the backlight unit 12. The light guide plate 19 is disposed at an inner area of the backlight unit 12 between the LED boards 18. Hereinafter, components of the backlight unit 12 will be described in detail.

Figure 3:
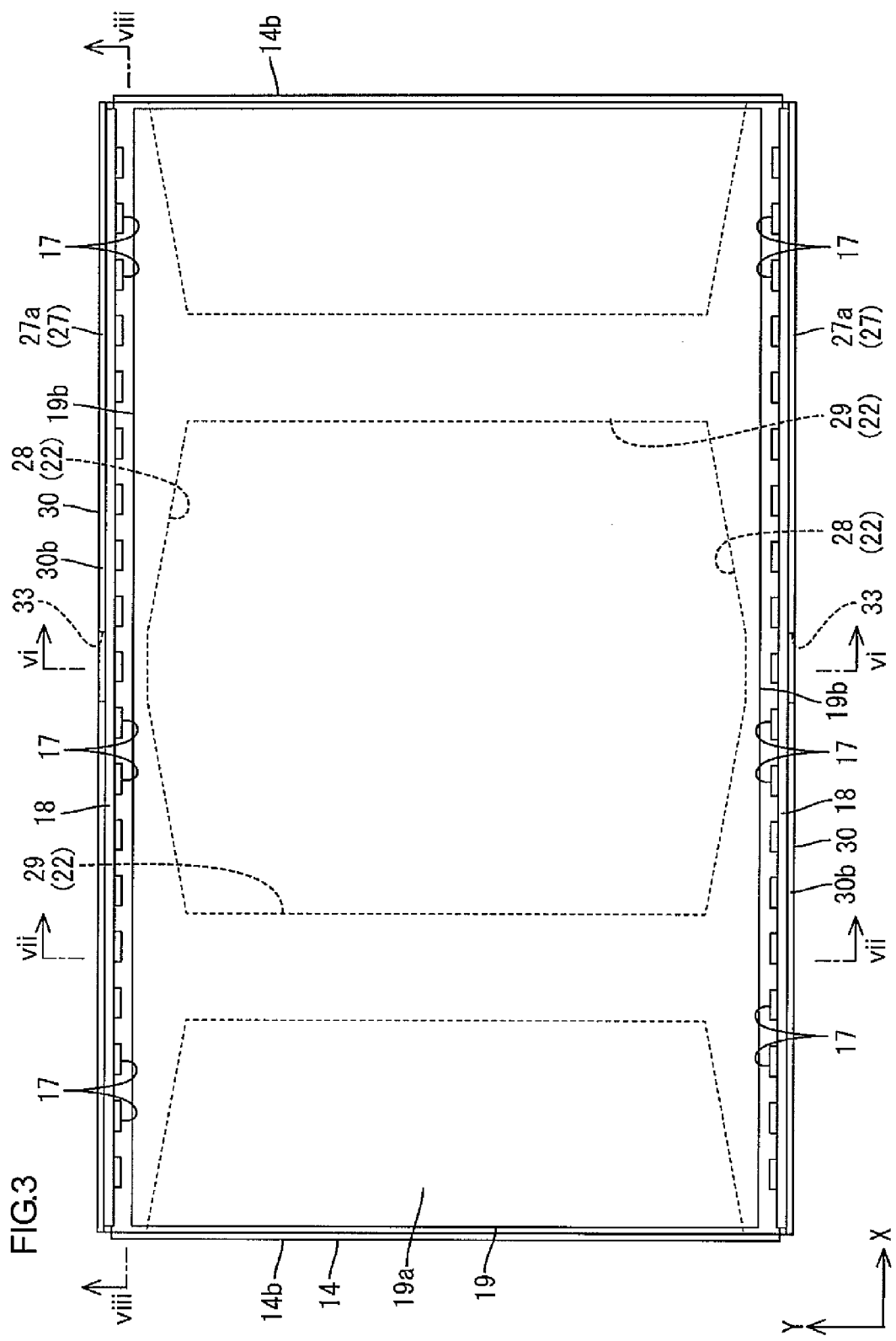
FIG. 3 is a plan view illustrating an arrangement configuration of a chassis, a duct member, a light guide plate, and LED boards in a backlight unit included the liquid crystal display device.

As illustrated in FIGS. 2 and 3, the chassis 14 has a landscape rectangular shape in a plan view, similar to the liquid crystal panel 11. A long-side direction and a short-side direction of the chassis 14 correspond to the X-axis direction (the horizontal direction) and the Y-axis direction (the vertical direction), respectively. The chassis 14 is opposite a back side of the light guide plate 19. The chassis 14 includes a bottom plate 14a and a pair of side plates 14b. The bottom plate 14a receives the light guide plate 19. Each of the side plates 14b protrudes from each short-side end portion of the bottom plate 14a toward the front side. The light guide plate 19 is sandwiched between the side plates 14b in the chassis 14. The bottom plate 14a has a plate-like shape extending in the X-axis and the Y-axis. Each of the side plate 14b has a plate-like shape extending in the Y-axis direction and the Z-axis direction. The frame 16 and the bezel 13 can be fixed to the side plate 14b with screws.

Figure 6:
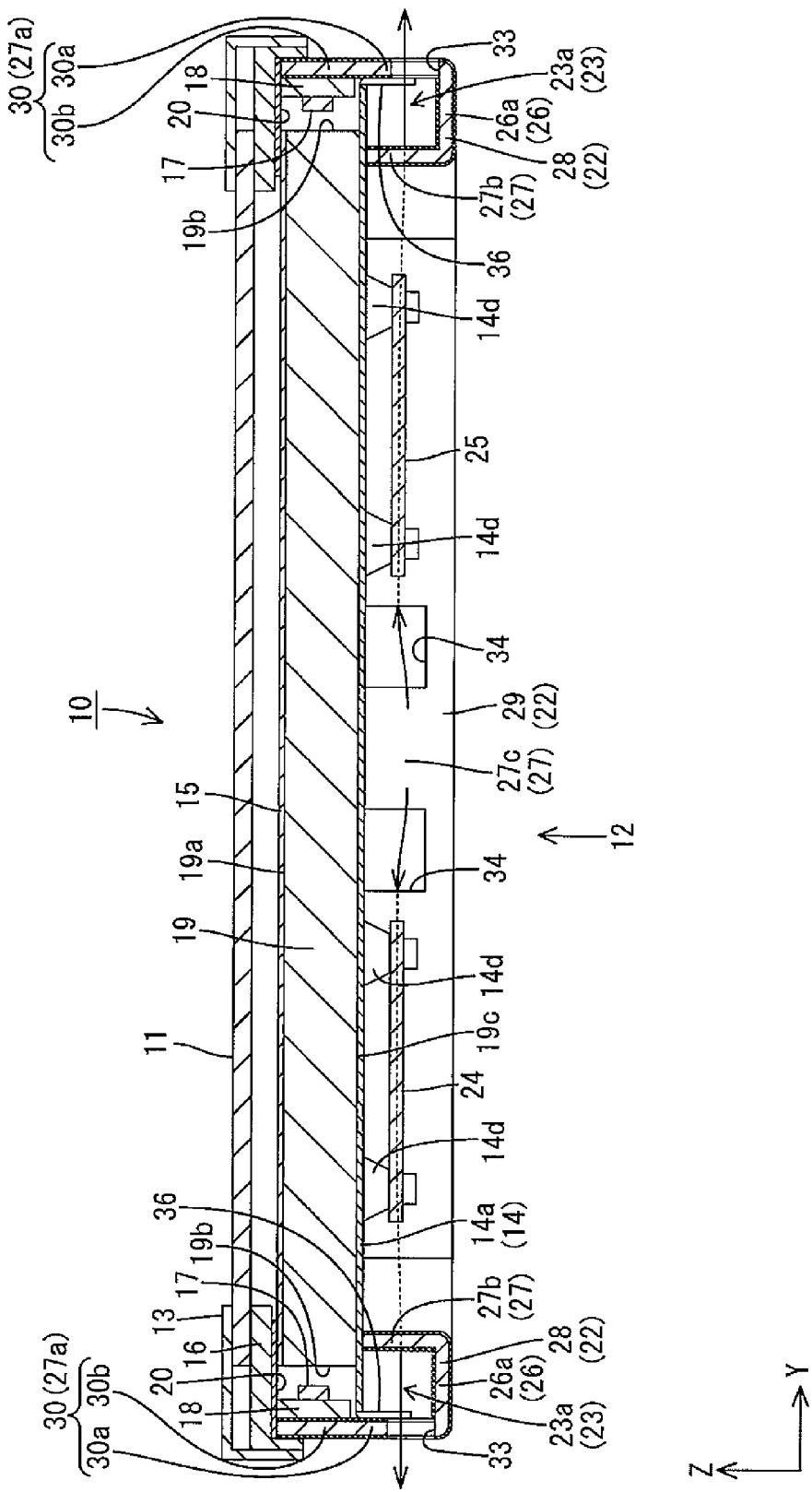
FIG. 6 is a cross-sectional view taken along line vi-vi of FIGS. 3 and 4.

As illustrated in FIG. 2, similar to the liquid crystal panel 11 and the chassis 14, the optical member 15 has a landscape rectangular shape in a plan view. The optical member 15 is placed on a front surface (a light exit side surface) of the light guide plate 19 and located between the liquid crystal panel 11 and the light guide plate 19. The optical member 15 includes a diffuser plate 15a arranged on the rear side and optical sheets 15b arranged on the front side. The diffuser plate 15a includes a plate-like base having a predetermined thickness. The base is made of substantially transparent synthetic resin with light-scattering particles dispersed therein. Light is diffused by the diffuser plate 15a while passing therethrough. Each optical sheet 15b has a sheet-like shape with a thickness smaller than that of the diffuser plate 15a. Three sheets are overlaid with each other. Each of the optical sheets 15b may be any one selected from a diffuser sheet, a lens sheet, and a reflecting type polarizing sheet. In FIG. 6, the optical member 15 is simplified.

As illustrated in FIG. 2, the frame 16 has a frame shape extending along outer edge portions of the optical member 15 and the light guide plate 19. The frame 16 is opposite the outer edge portions of the optical member 15 and the light guide plate 19 so as to hold down substantially entire edges of the optical member 15 and the light guide plate 19 from the front side. The frame 16 is made of synthetic resin. The front surface of the frame 16 may be colored in black so as to have light blocking properties. As illustrated in FIG. 6, first reflection sheets 20 that reflect light are attached on a rear surface of respective long-side portions of the frame 16, i.e. a surface opposite the light guide plate 19 and the LED board 18 (the LEDs 17). Each of the first reflection sheets 20 extends over substantially an entire length of the long-side portion of the frame 16. The first reflection sheet 20 covers corresponding end portions on an LED 17 side of the light guide plate 19 and the LED board 18 from the front side together. The frame 16 receives outer edge portions of the liquid crystal panel 11 from the rear side.

As illustrated in FIGS. 3 and 6, each of the LEDs 17 includes an LED chip that is arranged on a board fixed on the LED board 18 and sealed with resin. The LED chip mounted on the board has one main light emission wavelength. Specifically, the LED chip that emits light in a single color of blue is used. The resin that reals the LED chip contains phosphors dispersed therein. The phosphors emit light in a predetermined color when excited by blue light emitted from the LED chip. Thus, overall color of light emitted from the LED 17 is while. The phosphors may be selected, as appropriate, from yellow phosphors that emit yellow light, green phosphors that emit green light, and red phosphors that emit red light. The phosphors may be used in combination of the above phosphors. The LED 17 includes a light-emitting surface that is opposite from a surface of the LED 17 on which the LED board 18 is mounted. Namely, the LED 17 is a top-surface-emitting type LED.

As illustrated in FIGS. 2, 3, and 6, each LED board 18 has an elongated plate-like shape extending in a long-side direction of the chassis 14 (the X-axis direction, a long-side direction of a light entrance surface 19b of the light guide plate 19). The LED board 18 is arranged in the chassis 14 such that plate surfaces of the LED board 18 are parallel to the X-Z plane, i.e., perpendicular to plate surfaces of the liquid crystal panel 11 and the light guide plate 19 (the optical member 15). The LED board 18 includes a mount surface on which the LEDs 17 are surface-mounted. The mount surface is a plate surface that faces an inner side, namely, a surface of the LED board 18 that faces the light guide plate 19 (the surface opposite the light guide plate 19). The LEDs 17 are apart from each other and arranged in line (i.e., linearly) on the mount surface of the LED board 18 along the long-side direction of the LED board 18 (the X-axis direction). In other words, multiple LEDs 17 are arranged at intervals in each of the long-side end portions of the backlight unit 12 along the long-side direction. Distances between the adjacent LEDs 17 in the X-axis direction are substantially equal, that is, the LEDs 17 are arranged at substantially equal intervals. An arrangement direction of the LEDs 17 corresponds to a longitudinal direction of the LED board 18 (the X-axis direction).

A metal-film trace (not illustrated), such as copper-foil trace, is formed on the mount surface of each LED board 18. The metal-film trace extends in the X-axis direction and crosses over a group of the LEDs so as to connect the adjacent LEDs 17 in series. Terminals at ends of each trace are connected to an external LED drive circuit board 24 via unillustrated wiring members (wiring harnesses). Thus, driving power is supplied to the LEDs 17. The LED boards 18 in pairs that are arranged in the chassis 14 such that the mount surface of each LED board 18 on which the LEDs 17 are mounted are opposite to each other. The light-emitting-surface of each LED 17 on one of the LED boards 18 is opposite the light-emitting-surface of the corresponding LED 17 on the other LED board 18. A light axis of each LED 17 substantially corresponds to the Y-axis direction. In other words, the LEDs 17 on each LED board 18 is arranged opposite the corresponding end portion of the light guide plate 19 in the Y-axis direction (a long-side end portion). A base member of each LED board 18 is made of metal, similar to the chassis 14. The traces (not illustrated) are formed on the surface of the LED board 18 with an insulating layer in between. A material used for the LED board 18 may be an insulating material such as ceramic or glass epoxy resin.

The light guide plate 19 is made of substantially transparent (high transmissivity) synthetic resin (e.g. acrylic resin or polycarbonate such as PMMA) that has a refractive index sufficiently higher than that of the air. As illustrated in FIG. 2, the light guide plate 19 has a landscape rectangular shape in a plan view similar to the liquid crystal panel 11 and the chassis 14. The light guide plate 19 has a thickness that is larger than that of the light guide plate 19. A long-side direction and a short-side direction of the plate surface of the light guide plate 19 correspond to the X-axis direction and the Y-axis direction, respectively. A thickness direction of the light guide plate 19 that is perpendicular to the surface of the light guide plate 19 corresponds to the Z-axis direction. As illustrated in FIG. 6, the light guide plate 19 is arranged right behind the liquid crystal panel 11 and the optical member 15 in the chassis 14 and located between the LED boards 18 arranged in the long-side edges of the chassis 14 in the Y-axis direction. Namely, an arrangement direction between the LEDs 17 (or the LED board 18) and the light guide plate 19 corresponds to the Y-axis direction. An arrangement direction between the optical member 15 (or the liquid crystal panel 11) and the light guide plate 19 corresponds to the Z-axis direction. The both arrangement directions are perpendicular to each other. The light guide plate 19 is configured to guide the light, which is emitted from the LEDs 17 in the Y-axis direction and enters the light guide plate 19, toward the optical member 15 (on the front side).

The light guide plate 19 has a plate-like shape extending along plate surfaces of the bottom plate 14a of the chassis 14 and the optical member 15. Plate surfaces of the light guide plate 19 are parallel to the X-Y plane. One of the plate surfaces (a surface opposite the optical member 15) of the light guide plate 19 on the front side is a light exit surface 19a. Light that is inside the light guide plate 19 exits through the light exit surface 19a toward the optical member 15 and the liquid crystal panel 11. The light guide plate 19 includes outer peripheral surfaces that are adjacent to the plate surfaces thereof. Among the outer peripheral surfaces, each long-side surface having a shape elongated along the X-axis direction is opposite the corresponding LEDs 17 (or the LED board 18) with a predetermined space therebetween. The long-side surfaces are light entrance surfaces 19b through each of which light emitted by the LEDs 17 enters the light guide plate 19. Each of the light entrance surfaces 19b is parallel to the X-axis direction (the arrangement direction of the LEDs 17) and the Z-axis direction. In other words, the light entrance surface 19b is parallel to a main plate surface of the LED board 18, and substantially perpendicular to the light exit surface 19a. An arrangement direction between the LEDs 17 and the light entrance surfaces 19b corresponds to the Y-axis direction, and parallel to the light exit surface 19b.

Figure 5:
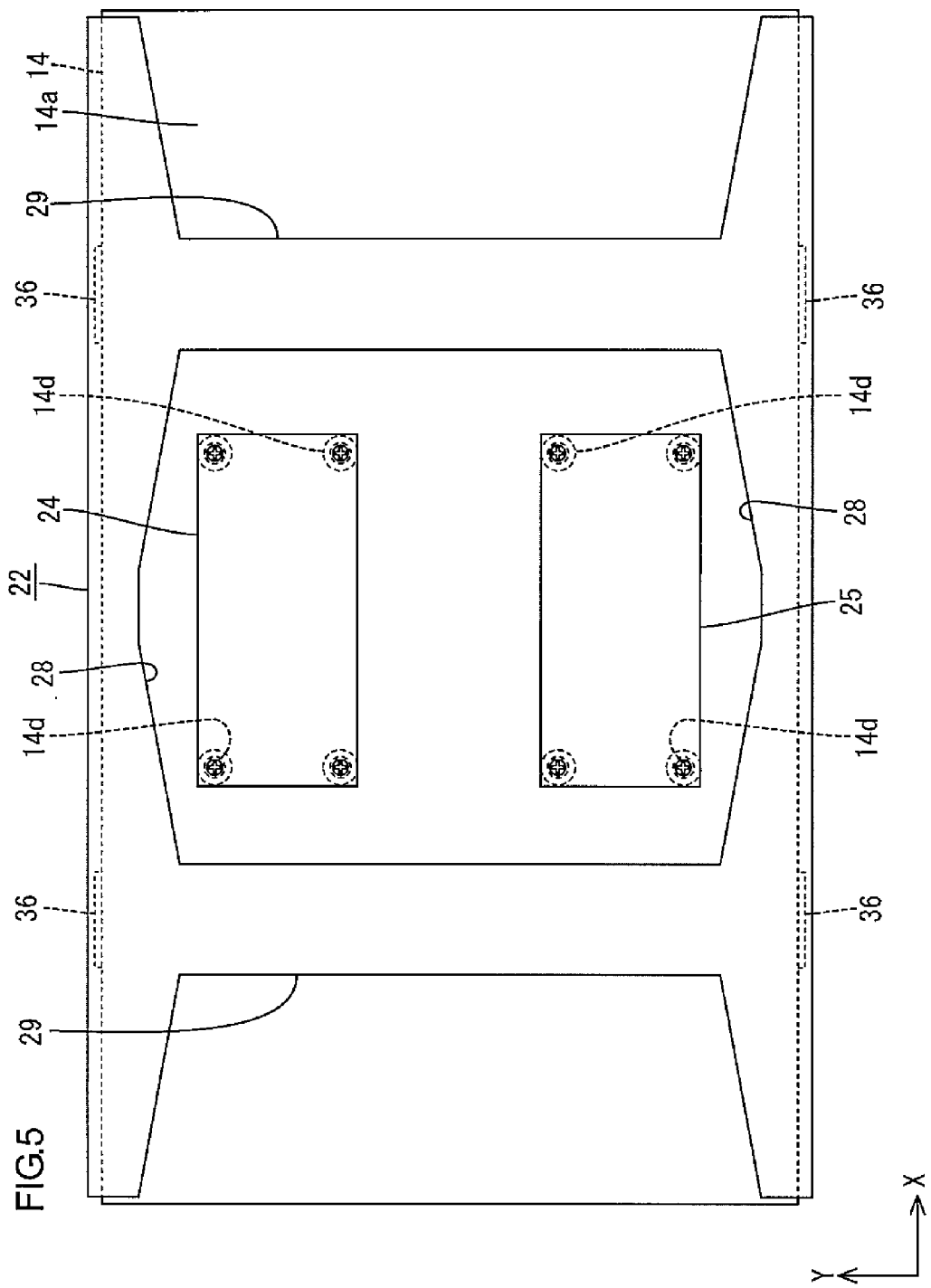
FIG. 5 is a bottom view illustrating an arrangement configuration of the chassis, the duct member, and boards in the backlight unit.

Next, the LED drive board 24, the control board 25, and the duct member 22 that are attached on the rear side outer portion of the chassis 14 will be described in detail. The LED drive board 24 includes a board that is made of a synthetic resin (a phenolic paper or a glass epoxy resin, for example). A circuit pattern is formed on the board and electric components are mounted thereon. As illustrated in FIGS. 2, 5, and 6, the LED drive board 24 is connected to the LED boards 18 disposed inside the chassis 14 and the power source P (see FIG. 1) disposed outside the chassis 14 via electric wires or flexible boards. The LED drive board 24 is configured to control turning on and off of the LEDs 17 mounted on the LED boards 18 by supplying driving voltages received from the power source P to the LEDs 17. The control board 25 includes a board that is made of a synthetic resin (a phenolic paper or a glass epoxy resin, for example) with a circuit pattern thereon. The control board 25 is configured to convert television signals, which are sent from the tuner T, to driving signals for liquid crystals, and supply the driving signals to the liquid crystal panel 11. The control board 25 is connected to the liquid crystal panel 11 via flexible boards on which drivers for driving liquid crystals are mounted (not illustrated). The LED drive board 24 and the control board 25 are located in a substantially middle area of the bottom plate 14a of the chassis 14 in the long-side direction and the short-side direction. The LED drive board 24 and the control board 25 are arranged adjacent to each other in the short-side direction. The bottom plate 14a of the chassis 14 includes mount bases 14d that project from a part of the bottom plate 14a toward the rear side. The LED drive board 24 and the control board 25 are attached to the mount bases 14d with screws.

Figure 4:
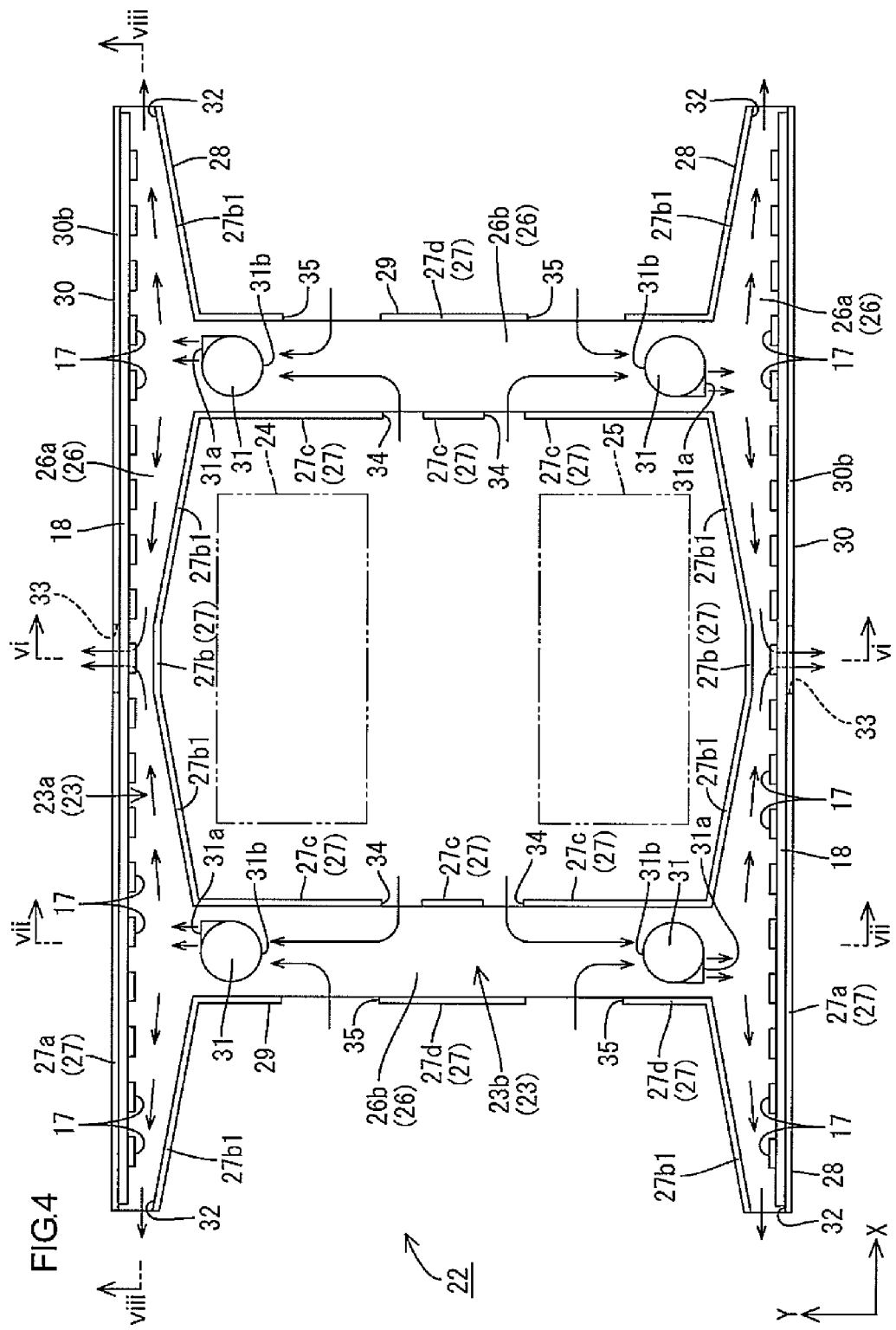
FIG. 4 is a plan view illustrating an arrangement configuration of the duct member, the LED boards, and fans in the backlight unit.

Next, the duct member 22 will be described. As illustrated in FIGS. 2 and 4, the duct member 22 has a substantially ladder shape as a whole in a plan view. Further, the duct member 22 has a substantially hollow shape with an opening on the front side such that the duct member 22 has an air passage 23 between the duct member 22 and the chassis 14. The duct member 22 includes a bottom wall 26 and sidewalls 27. The bottom wall 26 is parallel to the bottom plate 14a of the chassis 14 and has a substantially ladder shape in a plan view. The sidewalls 27 that project from respective outer peripheral edges of the bottom wall 26 toward the front side are arranged opposite to each other in pairs. A space that is surrounded and defined by the bottom wall 26, the sidewalls 27, and the bottom plate 14a of the chassis 14 is the air passage 23. The duct member 22 having such a configuration is mounted on the back surface side of the chassis 14, and thus the chassis 14 is strengthened. Further, with the air passage 23 provided between the duct member 22 and the chassis 14, air that flows through the air passage 23 is less likely to leak into a space within the chassis 14 and dust that may exist in the air passage 23 is less likely to penetrate into the space within the chassis 14. With this configuration, the dust is less likely to be attached to the light guide plate 19 or the LEDs 17 and thus sufficient optical performance can be exerted.

As illustrated in FIGS. 2 and 4, the duct member 22 includes a pair of first duct portions 28 and a pair of second duct portions 29. The first duct portions 28 extend along the long-side direction (the X-axis direction, a longitudinal direction of the LED board 18) of the chassis 14. The second duct portions 29 extend along the short-side direction (the Y-axis direction, a direction perpendicular to a direction in which the first duct portion 28 extends) of the chassis 14. Fans (blowers) 31 are disposed in each of the second duct portions 29. Each second duct portion 29 has end portions with respect to an extending direction thereof (the X-axis direction). Each of the end portions is connected to an intermediate portion of the corresponding first duct portion 28 with respect to an extending direction thereof. When the fans 31 mounted in the second duct portion 29 blow air inside the air passage 23, the air flows from the second duct portion 29 toward the first duct portions 28. Namely, the second duct portion 29 is an upstream side and the first duct portion 28 is a downstream side. In each of FIGS. 4 and 6 to 8, airflow directions in the air passage 23 are indicated by arrows. The bottom wall 26 of the duct member 22 includes first bottom wall portions 26a included in the first duct portions 28 and second bottom wall portions 26b included in the second duct portions 29. The sidewalls 27 include a pair of first sidewall portions 27a and 27b included in the first duct portion 28 and a pair of second sidewall portions 27c and 27d included in the second duct portion 29. The air passage 23 in the duct member 22 includes first air passages 23a in the first duct portions 28 and second air passages 23b in the second duct portions 29.

As illustrated in FIGS. 4 and 5, the first duct portion 28 covers an end portion of the chassis 14 extending in the long-side direction of the chassis 14 from the rear side. The first duct portion 28 extends over substantially an entire length of the long-side end portion. The first duct portion 28 has edge-side outlets 32 at respective ends with respect to a long-side direction thereof. Each of the edge-side outlets 32 opens to the outside so that air in the corresponding first air passage 23a exits therethrough. The first duct portion 28 includes the first bottom wall portion 26a and the first sidewall portions 27a and 27b. The first bottom wall portion 26a has an elongated shape extending along the long-side direction of the chassis 14. The first sidewall portions 27a and 27b protrude from end portions of the first bottom wall portion 26a along an extending direction (the X-axis direction) of the first bottom wall portion 26a toward the front side. Each first sidewall portion 27a, 27b extends over substantially an entire length of the first bottom wall portion 26a. The first bottom wall portion 26a has an outer end portion along the extending direction thereof that is substantially straight over the entire length. The first sidewall portion 27a on the outer side that is formed along the outer end portion of the first bottom wall portion 26a has a straight shape over the substantially entire length. On the other hand, the first bottom wall portion 26a has an inner end portion along the extending direction and a part of the inner end portion has a tapered shape in a plan view. The first sidewall portion 27b on the inner side that is formed along the inner end portion of the first bottom wall portion 26a has a portion having a tapered shape in a plan view. Specifically, a width of the first bottom wall portion 26a and a distance between the pair of sidewall portions 27a and 27b, that is, a width of the first air passage 23 varies in the length direction (the X-axis direction). The first duct portion 28 has a maximum width in a connection area (a portion through which air flows to the first duct portion 28) with the second duct portion 29 and a width of the first duct portion 28 gradually and continuously reduces as is away from the connection area (as is closer to the outlets 32, 33). Namely, each first sidewall portion 27b on the inner side includes tapered portions 27b1 that serve as straightening plates to straighten and smooth the air flow in the first air passage 23a. The first sidewall portion 27b on the inner side has openings to be communicated with the respective second duct portions 29. An opening edge of each opening is connected to the second sidewall portions 27c and 27d. Each of the edge-side outlets 32 opens to the outside at each end of the first duct portion 28 in the X-axis direction, i.e., opens along a wall surface of the corresponding first bottom wall portion 26a. In other words, the edge-side outlet 32 opens to the radially outer side of the duct member 22.

As illustrated in FIGS. 2 and 6, the first sidewall portion 27a on the outer side that protrudes from the first bottom wall portion 26a has a protruding height greater than that of the first sidewall portion 27b on the inner side. The first sidewall portion 27b on the outer side includes an LED attachment portion 30b at a protruded end portion thereof. The LED attachment portion 30b is located on the front side relative to the bottom plate 14a of the chassis 14. The LED board 18 is arranged on the LED attachment portion 30b. The first sidewall portion 27a on the outer side further includes a heat dissipation portion 30a at a protruding base portion thereof. The heat dissipation portion 30a is located on the rear side of the bottom plate 14a of the chassis 14. The heat dissipation portion 30a faces the first air passage 23a so that air that passes through the first air passage 23a cools down the heat dissipation portion 30a. Namely, the first sidewall portion 27a of each first duct portion 28 constitutes a dissipative LED attachment portion 30 including the heat dissipation portion 30a and the LED attachment portion 30b. The heat dissipation portion 30a is located outside the chassis 14 and faces the first air passage 23a. The LED attachment portion 30b protrudes to a space within the chassis 14 and the LEDs 17 are mounted thereon. Accordingly, one pair of the first duct portions 28 includes one pair of the dissipative LED attachment portions 30. The dissipative LED attachment portions 30 are arranged outside the respective ends in the short-side direction of the chassis 14 so as to sandwich the chassis 14 in the short-side direction.

As illustrated in FIGS. 4 and 6, the LED attachment portion 30b of the dissipative LED attachment portion 30 extends over a substantially entire length of the LED board 18 in the X-axis direction. The LED board 18 is attached on an inner wall of the LED attachment portion 30b. The LED attachment portion 30b extends along an arrangement direction in which the multiple LEDs 17 on the LED board 18 are arranged. Therefore, heat generated by the arranged LEDs 17 is efficiently transferred to the LED attachment portion 30b. As illustrated in FIG. 3, the LED attachment portions 30b are arranged on end portions of the chassis 14 along the long-side direction. Since the side plates 14b of the chassis 14 are located on the short-side end portions of the chassis 14, the LED attachment portions 30b and the side plates 14b surround the outer peripheral surfaces of the light guide plate 19. As illustrated in FIGS. 4 and 6, each heat dissipation portion 30a extends along the X-axis direction having the same length as the LED attachment portion 30b. An inner plate surface of the heat dissipation portion 30a faces the first air passage 23a of the first duct portion 28. Therefore, heat is efficiently transferred from the LED attachment portion 30b to the heat dissipation portion 30a. Further, a substantially entire area of the inner plate surface of the heat dissipation portion 30a is subject to the air that passes through the first air passage 23a. Therefore, heat that is generated by the LEDs 17 and transferred from the LED attachment portion 30b is effectively dissipated. The heat dissipation portion 30a and the LED attachment portion 30b continue to each other without any steps. In other words, the dissipative LED attachment portion 30 is a flat plate without any bent portions. The heat dissipation portion 30a of the dissipative LED attachment portion 30 that faces the first air passage 23a has a middle outlet 33. The middle outlet 33 opens to the outside for discharging air in the first air passage 23a to the outside. The middle outlet 33 is at a middle portion of the dissipative LED attachment portion 30 in the long-side direction between the second duct portions 29. Air that flows from the second air passages 23b of the second duct portions 29 to the first air passage 23a of the first duct portion 28 partially flows to the middle side of the first duct portion 28. The air in the middle side of the first duct portion 28 is efficiently exit to the outside through the middle outlet 33. The middle outlet 33 opens to the outside in the Y-axis direction, i.e., opens along the wall surface of the first bottom wall portion 26a, that is, opens to the radially outer side of the duct member 22.

As illustrated in FIG. 5, the second duct portions 29 are band-like portions in pairs that are arranged apart from each other in the long-side direction of the chassis 14. Each of the second duct portions 29 extends along the short-side direction of the chassis 14 and covers substantially an entire short-side length of the chassis 14 from the rear side. End portions of each second duct portion 29 in an extending direction (the Y-axis direction) thereof are connected to the first duct portions 28, respectively. As illustrated in FIG. 4, each of the second duct portions 29 is connected to the intermediate area of the first duct portion 28 that is located between each of the end portions and the middle portion of the first duct portion 28 with respect to the extending direction thereof (the X-axis direction). Therefore, a distance between the second duct portion 29 and the edge-side outlet 32 of the first duct portion 28 substantially equals to a distance between the second duct portion 29 and the middle outlet 33. The second duct portion 29 includes the second bottom wall portion 26b and the pair of second sidewall portions 27c and 27d. The second bottom wall portion 26b has an elongated shape extending along the short-side direction of the chassis 14. The second sidewall portions 27c and 27d extend from end portions along an extending direction (the Y-axis direction) of the second bottom wall portion 26b toward the front side. The second sidewall portions 27c and 27d extend along an entire length of the second bottom wall portion 26b. The second bottom wall portion 26b has a substantially constant width over its entire length. Since the second sidewall portions 27c and 27d are arranged at end portions in the width direction of the second bottom wall portion 26b, each of the second sidewall portions 27c and 27d has a straight shape over its entire length in the extending direction.

Figure 7:
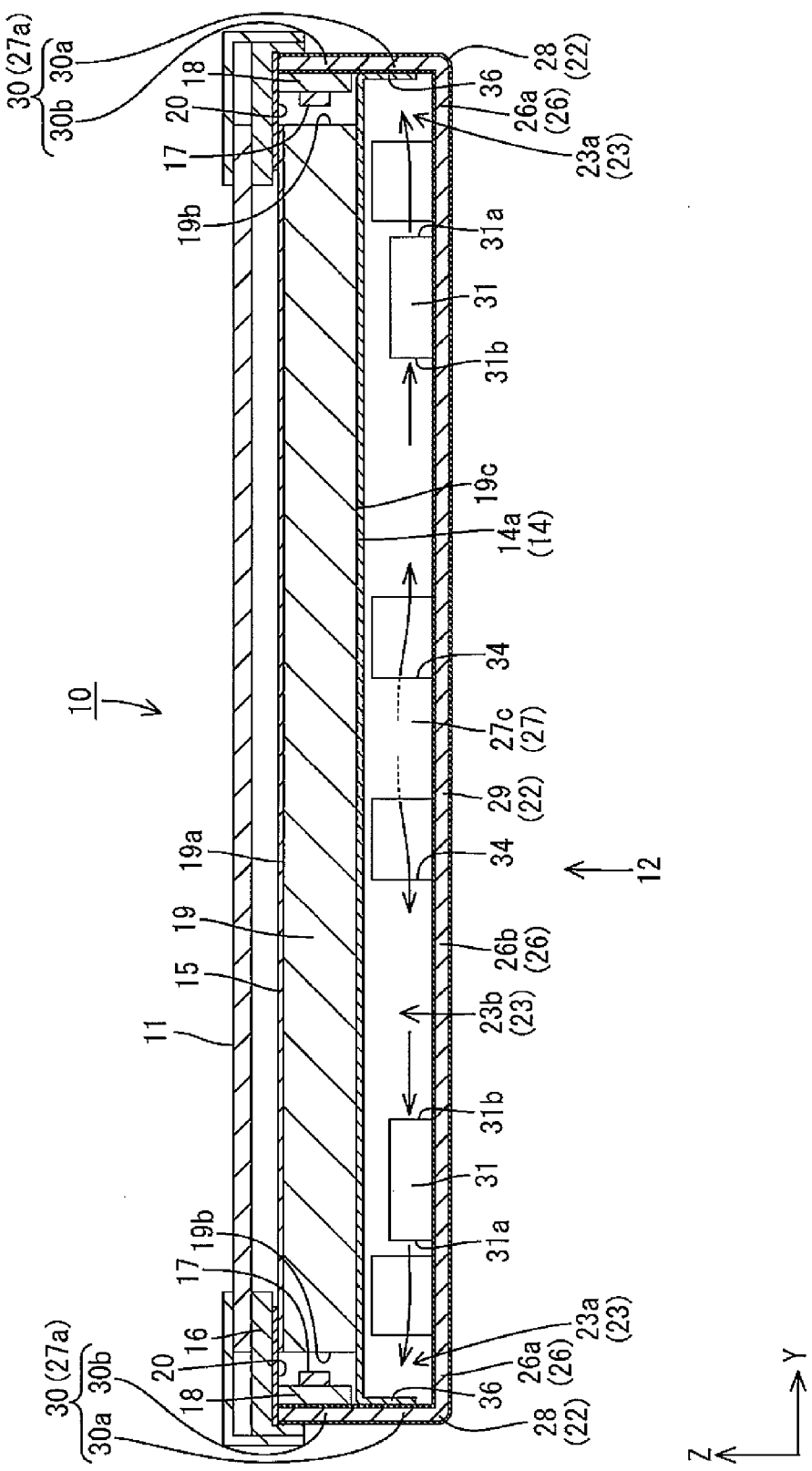
FIG. 7 is a cross-sectional view taken along line vii-vii of FIGS. 3 and 4.

As illustrated in FIGS. 4 and 7, the fans 31 are mounted on the second bottom wall portions 26b of the second duct portions 29. The fans 31 are configured to blow air in the air passage 23 to improve air-flow properties. The fans 31 are symmetrically arranged in pairs at end areas in the longitudinal direction of each second duct portion 29. Specifically, each fan 31 is a multi-blade blower so-called a sirocco fan and includes a fan case (a casing), an impeller, and a motor. The impeller is rotatably disposed inside the fan case. The motor is configured to rotate the impeller. The fan case has a blowing port (an air blow port) 31a through which air blows out and an intake port (a suction port) 31b through which air flows in. The blowing port 31a and the intake port 31b open to opposite directions. The impeller having a substantially cylindrical shape includes multiple vanes (blades) that are arranged along the periphery at substantially the same pitch angle. The motor includes a driving shaft that is connected to the impeller to rotate the impeller at a predetermined speed. Accordingly, the fan 31 takes air therein through the intake port 31b when the motor drives and the impeller rotates, and blows out the air through the blowing port 31a at a predetermined wind pressure (wind volume). The blowing port 31a and the intake port 31b of the fan 31 open to the opposite sides in the Y-axis direction in the second duct portion 29. Specifically, the blowing port 31a faces the first duct portion 28 that is adjacent to the fan 31. The intake port 31b faces a middle portion of the second duct portion 29 with respect to the longitudinal direction thereof. In such an attachment position, because the blowing port 31a of the fan 31 faces heat dissipation portion 30a of the dissipative LED attachment portion 30, air flowing out through the blowing port 31a efficiently hits the heat dissipation portion 30a and promotes heat dissipation.

As illustrated in FIGS. 4 and 7, the pair of second sidewall portions 27c and 27d included in each second duct portion 29 has inlets 34 and 35. Each of the inlets 34 and 35 opens to the outside so that external air flows into the second air passage 23b therethrough. Each inlet 34, 35 is formed in a middle area of the second duct portion 29 that is inward from the ends of the second duct portion 29 with respect to its longitudinal direction (the Y-axis) or that is inward from the fans 31. With such a configuration, the outside air flows into each fan 31 through the intake port 31b. Specifically, each second sidewall portion 27c that is located on the inner side than the corresponding second sidewall portion 27d has a pair of inner inlets 34. Each second sidewall portion 27d that is located on the outer side than the corresponding second sidewall portion 27c has a pair of outer inlets 35. The inner inlets 34 and the outer inlets 35 are displaced (in an offset position) to each other in a longitudinal direction (the Y-axis direction or a direction along the wall surface of the second bottom wall portion 26b) of the second duct portion 29 or the second air passage 23b. With this configuration, the strength of the second duct portion 29, which may be lowered by forming openings such as inlets 34 or 35 in the second duct portion 29, is less likely to be lowered. The inner inlets 34 are located closer to the middle area of the second duct portion 29 than the outer inlets 35 with respect to the longitudinal direction of the second duct portion 29. In other words, the inner inlets 34 are located relatively far from the fans 31. Each inner inlet 34 has an opening width (an opening area) relatively smaller than that of outer inlet 35. The paired inner inlets 34 and the paired outer inlets 35 are respectively arranged at symmetrical positions with respect to a center of the second duct portion 29 in the longitudinal direction. Each of the inlets 34 and 35 opens to the outside in the X-axis direction in the second duct portion 29, that is, along the wall surface of the second bottom wall portion 26b. The inner inlets 34 open inward in the radial direction of the duct member 22. The outer inlets 35 open outward in the radial direction of the duct member 22.

As illustrated in FIGS. 2 and 7, the chassis 14 includes fixing pieces 36 to fix the duct member 22 having the above-described configuration and the chassis 14 together. The fixing pieces 36 extend from respective end portions of the bottom plate 14a along the long-side direction (the X-axis direction) in the chassis 14 toward the rear side, that is, toward the duct member 22. Each fixing piece 36 is a small plate having landscape rectangular shape in a side view. A plate surface of the fixing piece 36 is parallel to the X-Z plane. In other words, the fixing piece 36 is parallel to the dissipative LED attachment portion 30 (or the first sidewall portion 27a). The fixing piece 36 is in surface contact with an inner plate surface of the dissipative LED attachment portion 30, and fixed thereto by welding or screws. The fixing piece 36 that is fixed to the heat dissipation portion 30a of the dissipative LED attachment portion 30 faces the first air passage 23a of the first duct portion 28. The fixing pieces 36 are arranged in pairs at each long-side end portion of the bottom plate 14a in the long-side direction so as to be spaced from each other in the long-side direction. When the duct member 22 is mounted to the chassis 14, each fixing piece 36 overlaps the second duct portion 29 in the X-axis direction. The fixing piece 36 that is fixed to the dissipative LED attachment portion 30 is located in the first air passage 23a of the first duct portion 28, and is located on a position straight in front of (opposite) the blowing port 31a of the fan 31. In this configuration, air blown from the fan 31 toward the first air passage 23a directly hits the fixing piece 36 that is located straight in front of the fan 31. The air is less likely to hit a portion of the heat dissipation portion 30a of the dissipative LED attachment portion 30 that is located straight in front of the fan 31. Therefore, the portion of the heat dissipation portion 30a is less likely to be locally cooled down.

As illustrated in FIG. 5, since the duct member 22 covers a part of the chassis 14 from the rear side, the chassis 14 includes a ductless area where the duct member 22 is not disposed. In the ductless area, the LED drive board 24 and the control board 25 having the above-described configurations are arranged next to the duct member 22. In other words, each of the LED drive board 24 and the control board 25 is attached to the chassis 14 so as to be adjacent to each other in the X-Y plane without overlaid with the duct member 22 in a front-rear relation in the Z-axis direction. Therefore, the thickness of the backlight unit 12 can be reduced. Specifically, the LED drive board 24 and the control board 25 are arranged in the middle portion of the chassis 14 in the X-axis direction and the Y-axis direction, and sandwiched between the pair of the first duct portions 28 and between the pair of the second duct portions 29. In other words, the LED drive board 24 and the control board 25 are surrounded by the pair of the first duct portions 28 and the pair of the second duct portions 29 that form a frame-like shape (a ring-like shape) as a whole. Further, the duct member 22 protrudes from the chassis 14 toward the rear side further than the LED drive board 24 and the control board 25. Therefore, the pair of the first duct portions 28 and the pair of the second duct portions 29 can protect the LED drive board 24 and the control board 25. Furthermore, the LED drive board 24 and the control board 25 are located in an outer side area (in an offset position) with respect to the inner inlets 34, which is formed in the second sidewall portion 27c on the inside of the second duct portion 29, in the Y-axis direction (the direction along the wall surface of the second bottom wall portion 26b). Therefore, even if the LED drive board 24 and the control board 25 generate heat, relatively high-temperature air around the LED drive board 24 and the control board 25 is less likely to flow through the inner inlet 34, and relatively low-temperature air flows through the inner inlet 34. This maintains high heat dissipation performance of the dissipative LED attachment portion.

Figure 9:
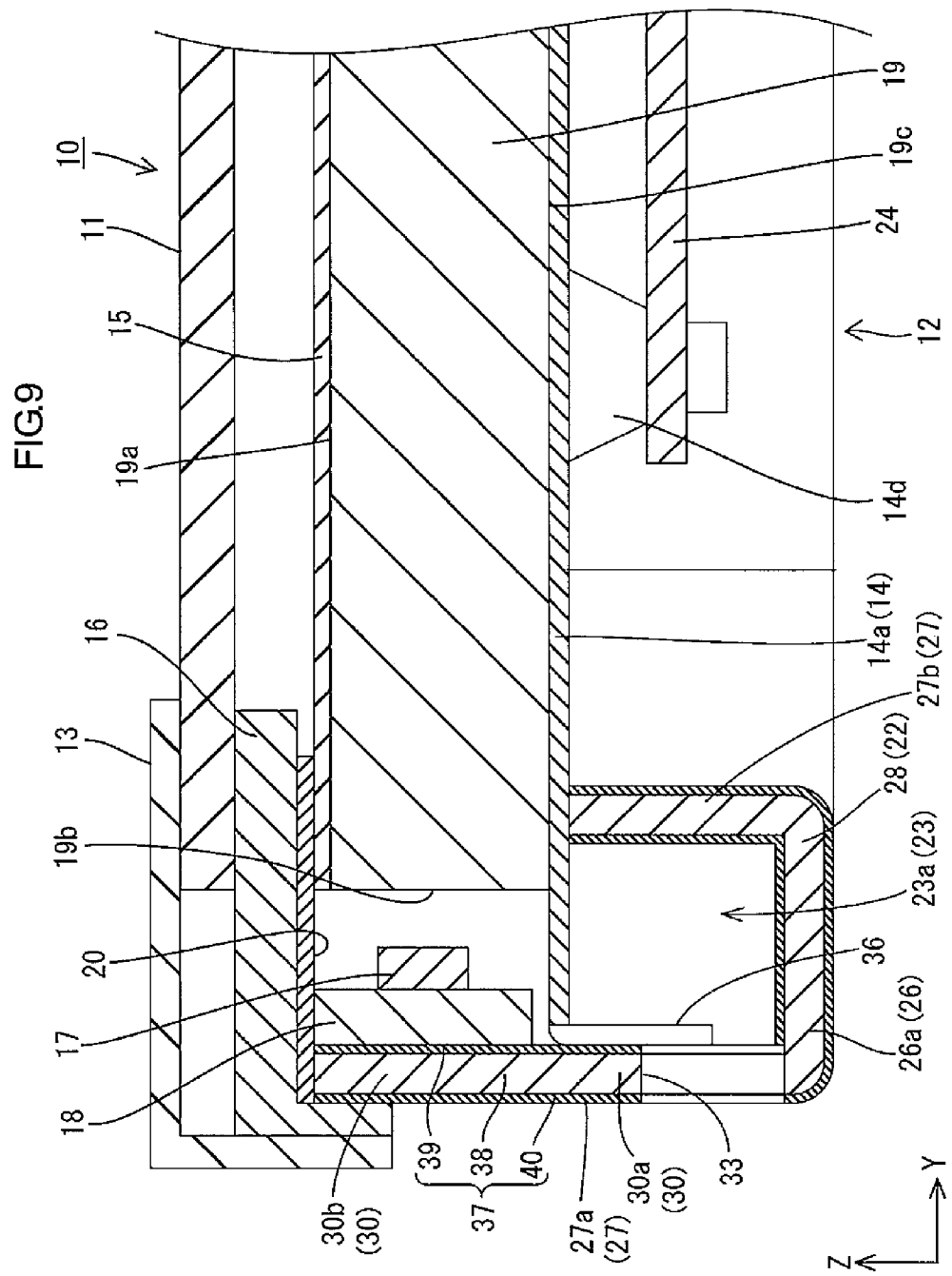
FIG. 9 is a magnified cross-sectional view of FIG. 6.
Figure 10:
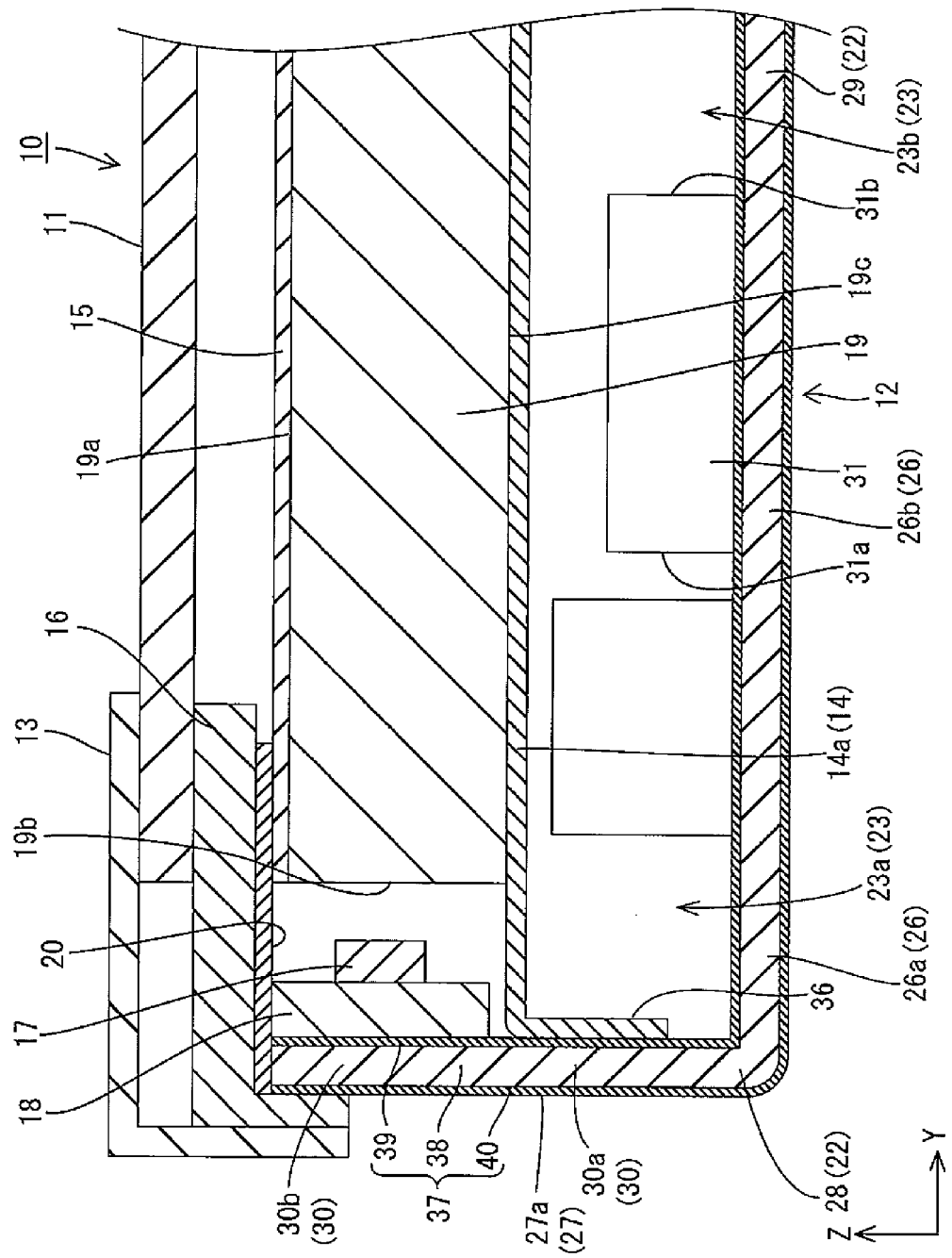
FIG. 10 is a magnified cross-sectional view of FIG. 7.

As illustrated in FIGS. 9 and 10, the above-described duct member 22 is formed of a composite plate 37 including a resin core 38 and a pair of metal plates 39 and 40 that sandwich the resin core 38 in between. Specifically, the resin core 38 of the composite plate 37 is made of a foamed resin material (e.g. foamed polyethylene or foamed polypropylene) and has a plate-like shape with a predetermined thickness. The specific gravity of the resin core 38 is smaller than that of the metal plate 39, 40. Each of the metal plates 39 and 40 of the composite plate 37 is made of aluminum and has a thin plate-like shape with a plate thickness smaller than that of the resin core 38. The metal plates 39 and 40 are attached to respective plate surfaces of the plate-like resin core 38 so as to cover the surfaces of the resin core 38 from the front side and the rear side. Namely, the composite plate 37 has a three-layer structure (a sandwiched structure). According to this configuration, the composite plate 37 is lighter in weight compared to a metal plate made of aluminum and having the same thickness as the composite plate 37. The metal plates 39 and 40 of the composite plate 37 have a high thermal conductivity. Therefore, heat propagates over a wide range of the metal plates 39 and 40 along plate surfaces of the metal plates 39 and 40. The resin core 38 of the composite plate 37 has high heat insulating properties. Therefore, heat is less likely to propagate in a plate thickness direction of the composite plate 37. Accordingly, heat propagation is considerably less likely to occur between the metal plates 39 and 40 that sandwich the resin core 38.

Since the resin core 38 is made of a foamed resin material, the duct member 22 is lighter in weight and has higher heat insulating properties compared to a configuration in which a non-foamed resin material is used as the material for the resin core. Furthermore, since the metal plates 39 and 40 are made of aluminum, the duct member 22 is lighter in weight and has higher thermal conductivity compared to a configuration in which iron is used as the material for the metal plates. The composite plate 37 has relatively lower strength than an aluminum metal plate having the same plate thickness as the composite plate 37. However, the composite plate 37 may have substantially the same strength as the aluminum metal plate by increasing its plate thickness larger than that of the aluminum metal plate. Even with such a configuration, the composite plate 37 is lighter in weight than the aluminum metal plate that has the same strength as the composite plate 37. In other words, the composite plate 37 of this embodiment having the plate thickness same as the aluminum metal plate or having the strength same as the aluminum metal plate is relatively lighter in weight compared to the aluminum metal plate. A specific plate thickness of the composite plate 37 of this embodiment is 1 mm, for example.

As illustrated in FIGS. 9 and 10, among the metal plates 39, 40 of the composite plate 37, the LED board 18 is mounted directly on a portion of the metal plate 39 that is included in the duct member 22 on an inner side thereof. The portion of the metal plate 39 corresponds to the LED attachment portion 30b of the dissipative LED attachment portion 30. The other portion of the metal plate 39 faces substantially an overall area of the air passage 23. According to this configuration, heat generated from the LEDs 17 is transferred via the LED board 18 to the portion of the inner metal plate 39 corresponding to the LED attachment portion 30b. The heat is then efficiently dissipated in air that flows through the air passage 23 via the portion of the inner metal plate 39 that faces the air passage 23. The metal plate 40 that is included in the duct member 22 on an outer side thereof remains thermally insulated from the inner metal plate 39 by the resin core 38. Therefore, heat is less likely to propagate from the inner metal plate 39 to the outer metal plate 40 and thus a temperature of the outer metal plate 40 is less likely to be increased. With this configuration, even if an external object contacts the outer metal plate 40, troubles are less likely to occur.

As described above, the duct member 22 is mounted on the chassis 14 from the rear side (an opposite side from the light exit portion 14c side) and supports the chassis 14 from the rear side. According to this configuration, mechanical strength of the chassis 14 is reinforced. Specifically, as illustrated in FIGS. 5 to 7, the duct member 22 has a ladder shape in a plan view and thus the duct member 22 has a high rigidity. Further, the duct member 22 includes the bottom wall 26 that faces the chassis 14, and includes the sidewalls 27 that extend from the bottom wall 26 to the chassis 14 so as to face each other. The extended ends of the sidewalls 27 are in contact with the bottom plate 14a of the chassis 14. With this configuration, the chassis 14 is effectively reinforced by the duct member 22 and thus the chassis 14 itself does not necessarily have high rigidity. Accordingly, a material other than metal can be selected for the chassis 14 or the chassis 14 may have a decreased plate thickness.

In this embodiment, the chassis 14 is formed of alight reflecting member 41 that is made of synthetic resin and has surfaces with a white color. Therefore, the weight of the chassis 14 is decreased compared to that of a chassis made of metal. Specifically, as illustrated in FIGS. 9 and 10, the chassis 14 is formed of the light reflecting member 41 made of white foamed polyethylene terephthalate (foamed PET) that is one kind of foamed resin materials and includes a large number of microscopic foams inside and surfaces thereof. With the foams, light is reflected with high efficiency. For example, MCPET (trademark) produced by Furukawa Electric Co., Ltd. is used for the light reflecting member 41. The bottom plate 14a of the chassis 14, which is the light reflecting member 41, supports the light guide plate 19 from the rear side so as to cover the substantially entire area of the rear plate surface 19c (the opposite side from the light exit surface 19a side) of the light guide plate 19. Light that propagates through the light guide plate 19 is effectively reflected by the bottom plate 14a of the chassis 14 and directed toward the front side (toward the light exit portion 14c). Therefore, compared to a configuration in which a chassis is made of metal and a reflection sheet for reflecting light is provided separately from the chassis, the number of parts and assembling steps can be reduced. Further, the weight and the thickness of the chassis 14 can be reduced. The bottom plate 14a includes long-side edge portions that extend outward with respect to respective light entrance surfaces 19b of the light guide plate 19. The extended portions are on the rear side of the respective first reflection sheets 20 and face the respective first reflection sheets 20. A space between the LEDs 17 and the light entrance surface 19b is also disposed between the first reflection sheet 20 and the extended portion of the bottom plate 14a that face each other. Therefore, light from the LEDs 17 is repeatedly reflected by the first reflection sheet 20 and the bottom plate 14a. Thus, light efficiently enters through the light entrance surface 19b. At least one of the light exit surface 19a and the plate surface 19c opposite from the light exit surface 19a of the light guide plate 19 has a reflection portion (not illustrated) or a scattering portion (not illustrated). The reflection portion is configured to reflect light in the light guide plate 19. The reflection portion or the scattering portion may be formed by patterning so as to have a specific in-plane distribution. This configuration regulates the light from the light exit surface 19a to have an even in-plane distribution.

The present embodiment has the above-described structure, and an operation thereof will be described. When the liquid crystal display device 10 having the above-described structure is tuned on, driving of the liquid crystal panel 11 is controlled by a control circuit on the control board 25, and driving of the LED 17 on the LED board 18 is controlled by driving power provided from an LED drive circuit on the LED drive board 24. The light emitted from each LED 17 is guided by the light guide plate 19 and applied to the liquid crystal panel 11 via the optical member 15. As a result, images are displayed on the liquid crystal panel 11. Hereinafter, operations of the backlight unit 12 will be explained.

As illustrated in FIG. 6, when the LED 17 is turned on, light emitted from the LED 17 enters the light guide plate 19 through the light entrance surface 19b. The LED 17 and the light entrance surface 19b are arranged with a predetermined space therebetween. The first reflection sheet 20 on the front side and the bottom plate 14a of the chassis 14 on the rear side, that is, the light reflecting plate 41, are arranged to have the space therebetween. Therefore, light from the LED 17 is repeatedly reflected by the first reflection sheet 20 and the bottom plate 14a and thus the light efficiently enters through the light entrance surface 19b. The light through the light entrance surface 19b is totally reflected by a boundary between the light guide plate 19 and air, or reflected by the bottom plate 14a of the chassis 14, namely, the light reflecting plate 41, while traveling through the light guide plate 19, and exits through the light exit surface 19a toward the optical member 15 on the front side.

Figure 8:
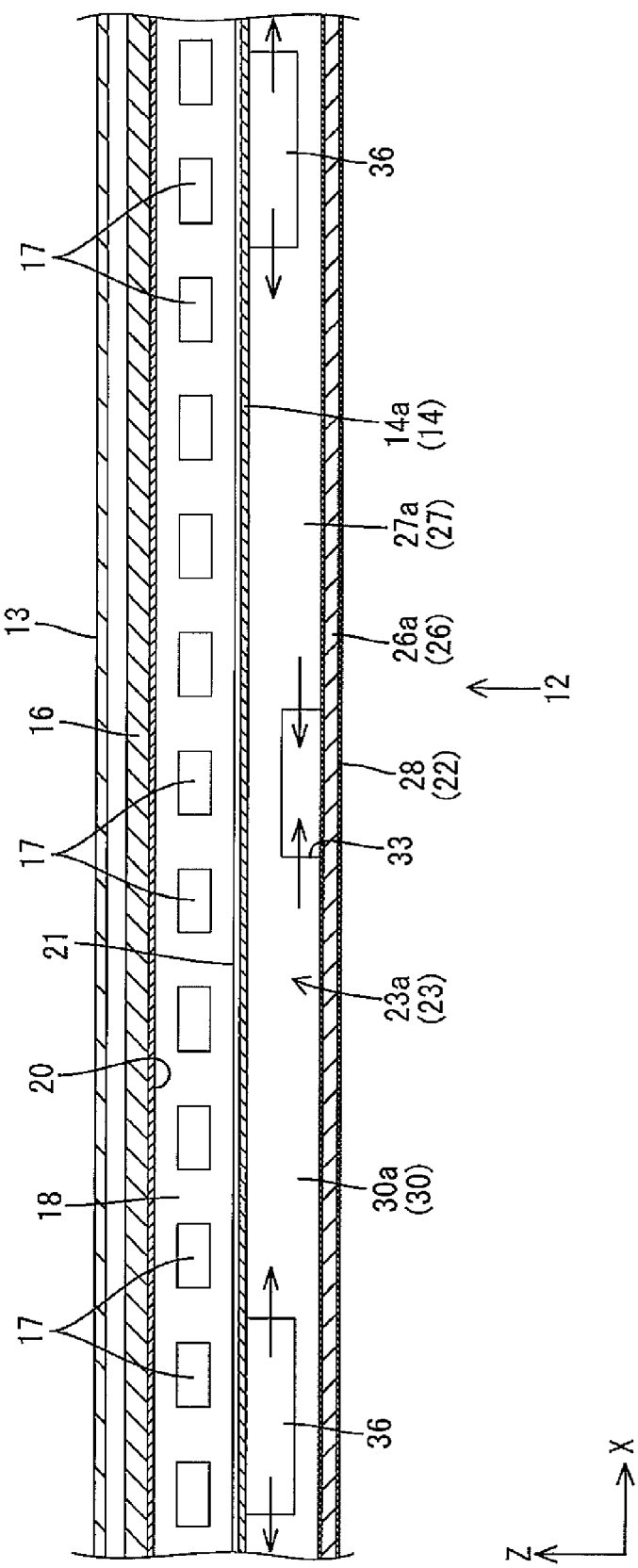
FIG. 8 is a cross-sectional view taken along line viii-viii of FIGS. 3 and 4.

As illustrated in FIGS. 6 to 8, heat generated by emission of light from the LEDs 17 is transferred via the LED board 18 to the LED attachment portion 30b of the dissipative LED attachment portion 30 of the duct member 22. The heat is then transferred to the heat dissipation portion 30a that is arranged on the outside of the chassis 14. Since the heat dissipation portion 30a faces the air passage 23 (the first air passage 23a)

of the duct member 22, heat transferred to the heat dissipation portion 30a is dissipated through air that flows through the air passage 23. Thus, heat from the LEDs 17 dissipates. As illustrated in FIGS. 9 and 10, the inner metal plate 39 of the composite plate 37 included in the duct member 22 constitutes an entire inner peripheral surface of the duct member 22. The LED board 18 is directly mounted on the inner metal plate 39 and also the inner metal plate 39 faces substantially an entire range of the air passage 23. According to this configuration, heat from the LEDs 17 is transferred via the LED board 18 to a portion of the inner metal plate 39 that corresponds to the LED attachment portion 30b. The heat is then transferred over a wide range of the inner metal plate 39 along its plate surface and dissipated in air that flows through the air passage 23.

To accelerate the dissipation of heat from the LEDs 17, fans 31 disposed in the duct member 22 are driven and to forcibly intake and exhaust air through the air passage 23 as illustrated in FIG. 4. A temperature sensor (not illustrated) may be disposed in the backlight unit 12 and the fans 31 may be driven only when an environmental temperature reaches a predetermined level. Or else, the fans 31 may be always driven while the liquid crystal display device 10 is powered on. When the fans 31 are driven, external air is drawn into the second air passage 23b through the inlets 34, 35 of the second duct portion 29, and the air is drawn into each fan 31 through the corresponding intake port 31b. Each of the inner inlets 34 is arranged offset from the LED drive board 24 and the control board 25. Therefore, even if the LED drive board 24 and the control board 25 are driven and generate heat, relatively low-temperature air is drawn through the inner inlet 34. The air is blown toward the first air passage 23a of the first duct portion 28 through the blowing port 31a. The air blown to the first air passage 23a directly hits each of the fixing pieces 36 of the chassis 14 that is arranged opposite the blowing port 31a of each fan 31 (FIG. 7). The fixing piece 36 covers a part of the heat dissipation portion 30a of the dissipative LED attachment portion 30. The covered part of the heat dissipation portion 30a does not directly receive the air from the fan 31. Therefore, the covered part is less likely to be excessively cooled down compared with the other part of the heat dissipation portion 30a. With this configuration, the overall heat dissipation portion 30a is evenly cooled down. The air that hits each fixing piece 36 flows to be branched into two directions along the X-axis direction. The heat dissipation portion 30a dissipates heat through the air flowing through the first air passage 23a in the X-axis direction. The air flowing toward an end of the first duct portion 28 exits through the edge-side outlet 32 to the outside. The air flowing toward a middle of the first duct portion 28 exits through the middle outlet 33 to the outside. As described above, since the fans 31 enforce air circulation in the air passage 23, the heat dissipation portion 30a of the dissipative LED attachment portion 30 that faces the air passage 23 is efficiently cooled down, and thus heat from each LED 17 is dissipated. With this configuration, even if the LEDs 17 are collectively arranged close to the end portion of the chassis 14 and heat is more likely to stay at the end, heat dissipation efficiency is enhanced in the backlight unit 12. Accordingly, output of the LEDs 17 can be increased and brightness of exit light from the backlight unit 12 may be easily improved.

As described above, the backlight unit (the lighting device) 12 according to this embodiment includes the chassis 14, the LEDs (the light source) 17, the light guide plate (the light guide member) 19, the duct member 22, and the dissipative LED attachment portion 30. The chassis 14 includes the light exit portion 14c through which light exits. The LEDs 17 are arranged close to the end portion of the chassis 14. The light guide plate 19 is arranged closer to the middle area of the chassis 14 than the LEDs 17 are and configured to guide light from the LEDs 17 toward the light exit portion 14c side. The duct member 22 is arranged on the side opposite to the light exit portion 14c side of the chassis 14 and has the air passage 23 there inside. The duct member 22 is formed of the composite plate 37 including the plate-like resin core 38 and a pair of the metal plates 39 and 40 that sandwich the resin core from the front side and the rear side. The dissipative LED attachment portion 30 is provided to the duct member 22. One part (the heat dissipation portion 30a) of the dissipative LED attachment portion 30 faces the air passage 23. Another part of the dissipative LED attachment portion 30 protrudes to a space within the chassis 14 and the LEDs 17 are attached thereto.

In this configuration, the other part of the dissipative LED attachment portion 30 protrudes to the space within the chassis 14, and the LEDs 17 that are attached to the other part of the dissipative LED attachment portion 30 are located close to the end portion of the chassis 14. Light emitted from the LED 17 is directed toward the light exit portion 14c side of the chassis 14 by the light guide plate 19 that is arranged in the inner area of the chassis 14 from the LEDs 17. Heat generated by emission of light from the LED 17 is transferred to the one part of the dissipative LED attachment portion 30 that faces the air passage 23 of the duct member 22, and the heat is efficiently dissipated through air that flows through the air passage 23. With this configuration, even in the backlight unit 12 in which the LEDs 17 are arranged close to the end portion of the chassis 14 and heat is more likely to stay the end portion, heat dissipation properties remain high. Therefore, brightness of exiting light may be easily enhanced by increasing output of the LEDs 17.

The duct member 22 is formed of the composite plate 37 including the plate-like resin core 38 and a pair of the metal plate 39 and 40 that sandwich the resin core 38 from the front side and the rear side. According to this configuration, the duct member 22 is reduced in weight compared to a duct member made of a metal plate. Specifically, compared to a duct member made of a metal plate, the duct member 22 formed of the composite plate 37 and having a thickness or mechanical strength substantially same as the duct member made of a metal plate is lighter in weight due to the resin core 38 included in the composite plate 37. Accordingly, heat dissipative properties of the backlight unit 12 are improved without increasing the weight.

The duct member 22 includes the bottom wall 26 and at least a pair of sidewalls 27. The bottom wall 26 is opposite the chassis 14. The at least a pair of sidewalls 27 protrude from the bottom wall 26 toward the chassis 14 and face each other. The bottom wall 26, the at least a pair of sidewalls 27, and the chassis 14 define the air passage 23 that is a space surrounded thereby. With this configuration, the chassis 14 can be reinforced by the duct member 22 including the bottom wall 26 and the pair of sidewalls 27 that define the air passage 23 together with the chassis 14. Therefore, the plate thickness of the chassis 14 may be decreased or a material that effectively reduces the weight may be selected for the chassis 14 even if such a material has relatively lower strength than a metal plate. Accordingly, the backlight unit 12 is further reduced in weight.

The chassis 14 is formed of the light reflecting plate 41 that is made of synthetic resin and includes surfaces having a white color. According to this configuration, light propagating through the light guide plate 19 is efficiently reflected by the chassis 14 toward the light exit portion 14c and thus high light use efficiency is achieved. Compared to a configuration in which a reflection sheet is provided separately from the chassis 14 for reflecting light propagating through the light guide plate 19, the number of components and assembling steps are reduced. Further, this configuration is preferable to reduce the weight and the thickness of the chassis 14.

The chassis 14 is formed of the light reflecting member 41 that is made of a foamed resin material. According to this configuration, the weight and the thickness of the chassis 14 are further reduced. Further, light reflectivity is effectively improved.

The fan (the blower) 31 is mounted on the duct member 22. The fan 31 includes the blowing port 31*a* that faces a part of the dissipative LED attachment portion 30 (the heat dissipation portion 30*a*) and through which air flows to the air passage 23. According to this configuration, air passing through the blowing port 31*a* of the fan 31 toward the air passage 23 efficiently hits a portion of the dissipative LED attachment portion 30 that is opposite the blowing port 31*a*, and thus heat from the LED 17 is efficiently dissipated.

The metal plates 39 and 40 of the composite plate 37 are made of aluminum. According to this configuration, the duct member 22 reduces its weight compared to a metal plate made of iron. Further, the metal plates 39 and 40 made of aluminum have a high thermal conductivity. Therefore, heat properly dissipates from air passing the air passage 23 of the duct member 22 to the metal plate. Accordingly, heat dissipative performance is further improved.

The resin core 38 of the composite plate 37 is made of foamed resin material. Compared to a resin core made of non-foamed resin material, weight reduction is further accomplished. Further, the resin core 38 made of foamed resin material has high thermal insulation properties. Therefore, a temperature of the metal plate 40, which is the member of the duct member 22 arranged on the outer side, is less likely to be increased. Accordingly, even when an external object comes in contact with the metal plate 40 on the outer side, troubles are less likely to occur.

Second Embodiment

A second embodiment of this invention will be described with reference to FIGS. 11 and 12. In the second embodiment, thermal conductive members 42 are attached to dissipative LED attachment portions 130. The same structures, operations, and effects as those of the first embodiment will not be described.

Figure 11:
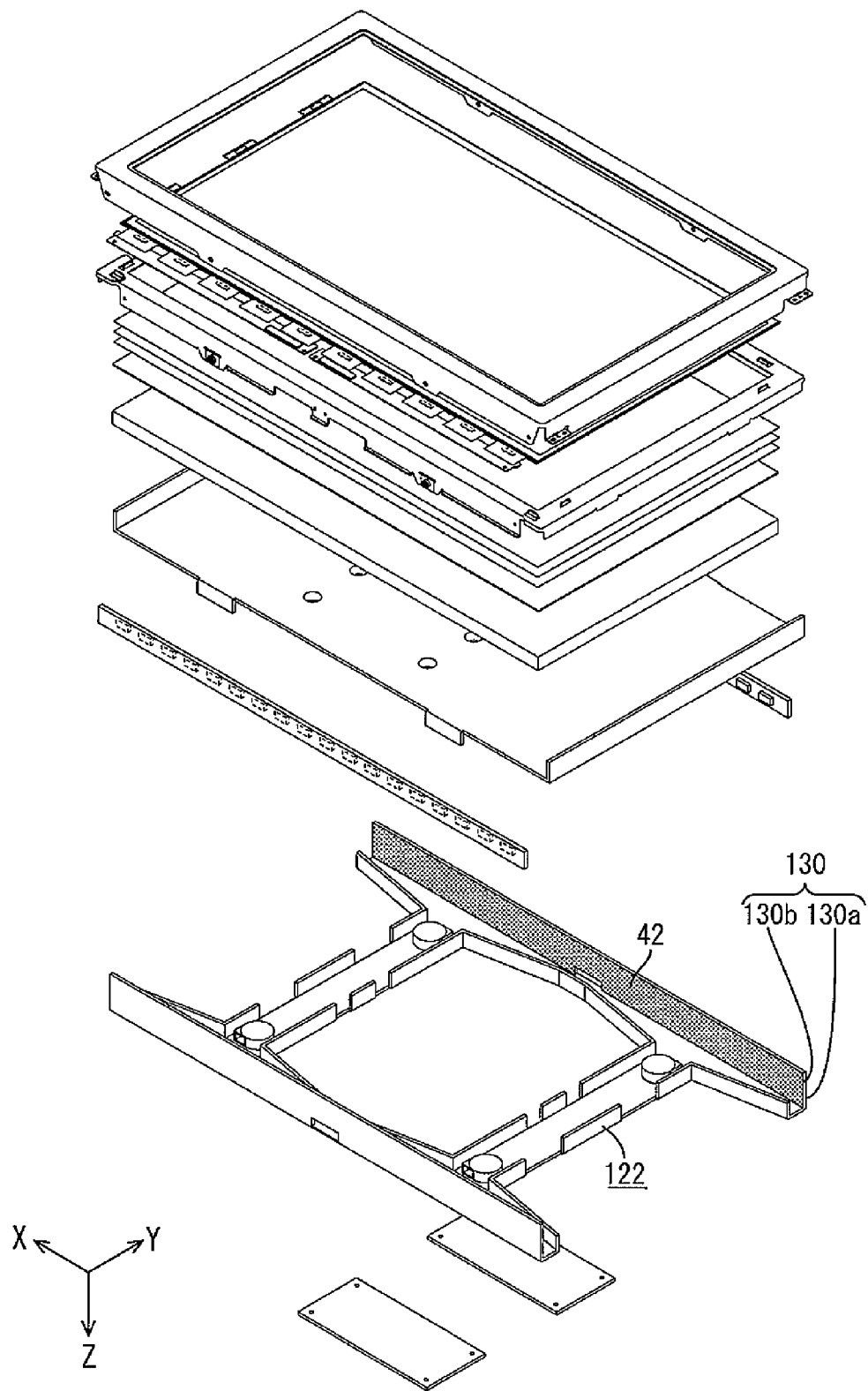
FIG. 11 is an exploded perspective view illustrating a general configuration of a liquid crystal display device according to a second embodiment of this invention.
Figure 12:
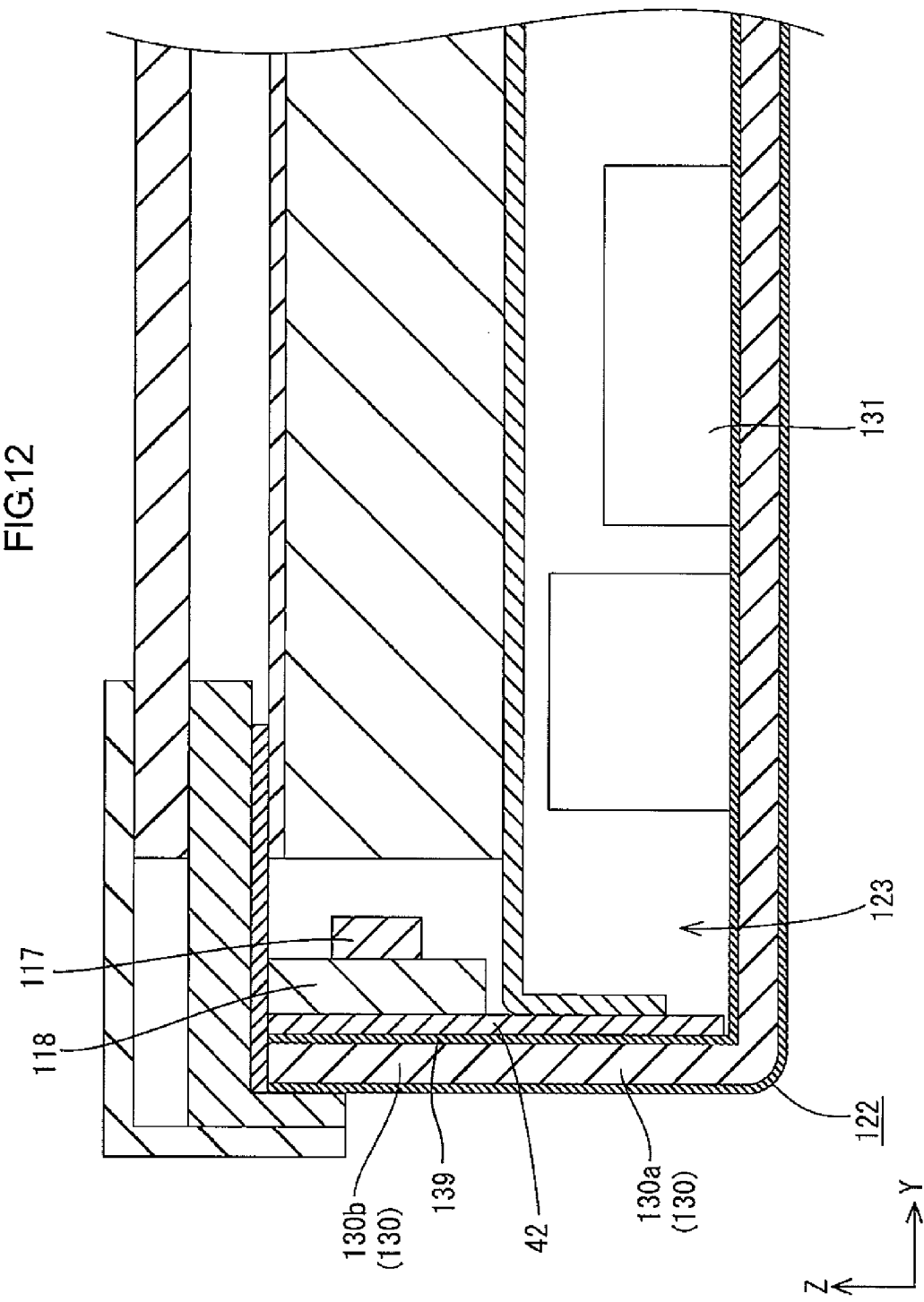
FIG. 12 is a cross-sectional view of the liquid crystal display device taken along a short-side direction thereof, illustrating a cross section taken along a second duct portion of a duct member.

As illustrated in FIGS. 11 and 12, the thermal conductive members 42 are attached to the respective dissipative LED attachment portions 130 of this embodiment. Specifically, the thermal conductive member 42 is attached to an inner surface of a portion of an inner metal plate 139 corresponding to the dissipative LED attachment portion 130 with a fixing member such as adhesive (bond) or double-sided tape. The thermal conductive member 42 extends over a range so as to cover an area of substantially an entire inner surface of the dissipative LED attachment portion 130. A portion of the thermal conductive member 42 attached to an LED attachment portion 130*b* of the dissipative LED attachment portion 130 is located between an LED board 118 and the LED attachment portion 130*b*. Another portion of the thermal conductive member 42 attached to a heat dissipation portion 130*a* of the heat dissipative LED attachment portion 130 directly faces an air passage 123. In FIG. 11, the thermal conductive member 42 is indicated with a shaded area.

The thermal conductive member 42 is made of a material having relatively a higher heat conductivity than a metal material of the metal plate 139 (i.e. aluminum) to which the thermal conductive member 42 is directly attached. Specifically, the thermal conductive member 42 is a graphite sheet, which is prepared by pyrolyzing and graphitizing a polymer film. The thermal conductivity of the graphite sheet is about 700 W/(m·K) to 1750 W/(m·K), which is about three times to seventh times higher than the thermal conductivity of aluminum (237 W/(m·K)). The thermal conductive member 42, that is, a graphite sheet, has a lower specific gravity than metal material used for the metal plate 139. This is preferable to reduce weight. In this embodiment, the thermal conductive member 42 having a high thermal conductivity is attached to the dissipative LED attachment portion 130. According to such a configuration, heat generated from LEDs 117 and transferred via the LED board 118 to the thermal conductive member 42 is dissipated over an entire area of the thermal conductive member 42 with considerably high efficiency. The heat is then dissipated in air that flows through the air passage 123 and thus heat dissipation efficiency is further improved. In this configuration, fans 131 arranged within a duct member 122 may not necessarily have high air-blowing performance. Namely, smaller fans may be used for the fans 131. Therefore, overall weight is further reduced.

As is described above, according to this embodiment, the thermal conductive member 42 is arranged between the LEDs 117 and the dissipative LED attachment portion 130. The thermal conductivity of the thermal conductive member 42 is relatively higher than that of the duct member 122. With this configuration, heat from the LEDs 117 is efficiently transferred to the dissipative LED attachment portion 130 and thus heat dissipation performance is further improved. In a configuration having high heat dissipation performance, small and light-weight fans can be used as the fans 131. Accordingly, overall weight of the backlight unit can be reduced.

The thermal conductive member 42 extends to the portion of the dissipative LED attachment portion 130 that faces the air passage 123 (i.e. the heat dissipation portion 130*a*). In this configuration, heat transferred from the LEDs 117 to the thermal conductive member 42 is transferred to the dissipative LED attachment portion 130. Further, the heat is dissipated from the portion of the dissipative LED attachment portion 130 that faces the air passage 123 in air that flows through the air passage 123. Accordingly, heat dissipation performance is further improved.

The thermal conductive member 42 is a graphite sheet. According to this configuration, the thermal conductive member 42 has a higher thermal conductivity than metal. Therefore, heat dissipation performance is further improved.

Third Embodiment

A third embodiment of this invention will be described with reference to FIGS. 13 and 14. In the third embodiment, a duct member 222 includes structures to hang wall-hook brackets WHB. The wall-hook brackets WHB are used to hang a liquid crystal display device 210 on a wall. The same structures, operations, and effects as those of the first embodiment will not be described.

Figure 13:
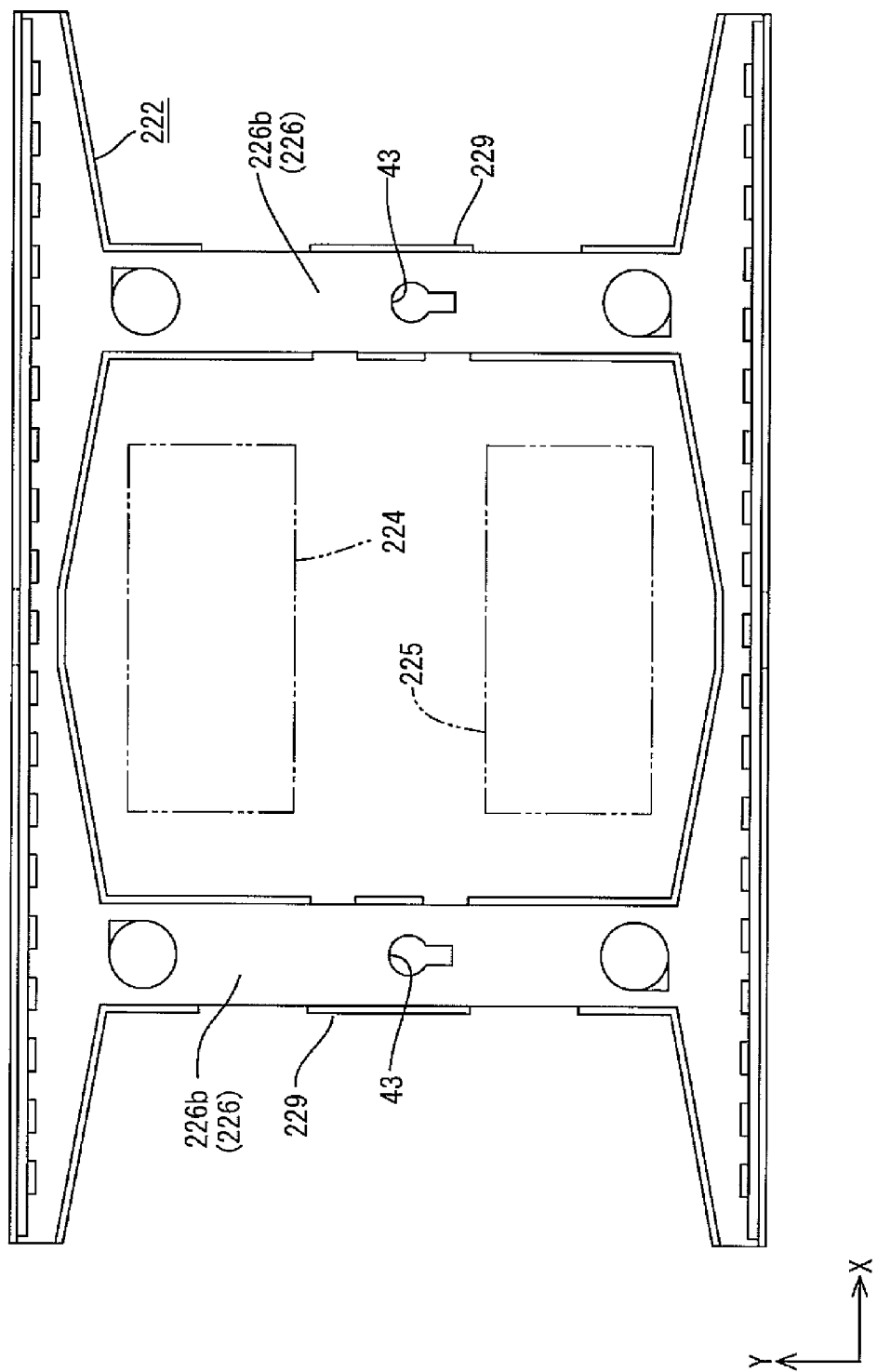
FIG. 13 is a plan view illustrating an arrangement configuration of a duct member, LED boards, and fans according to a third embodiment of this invention.
Figure 14:
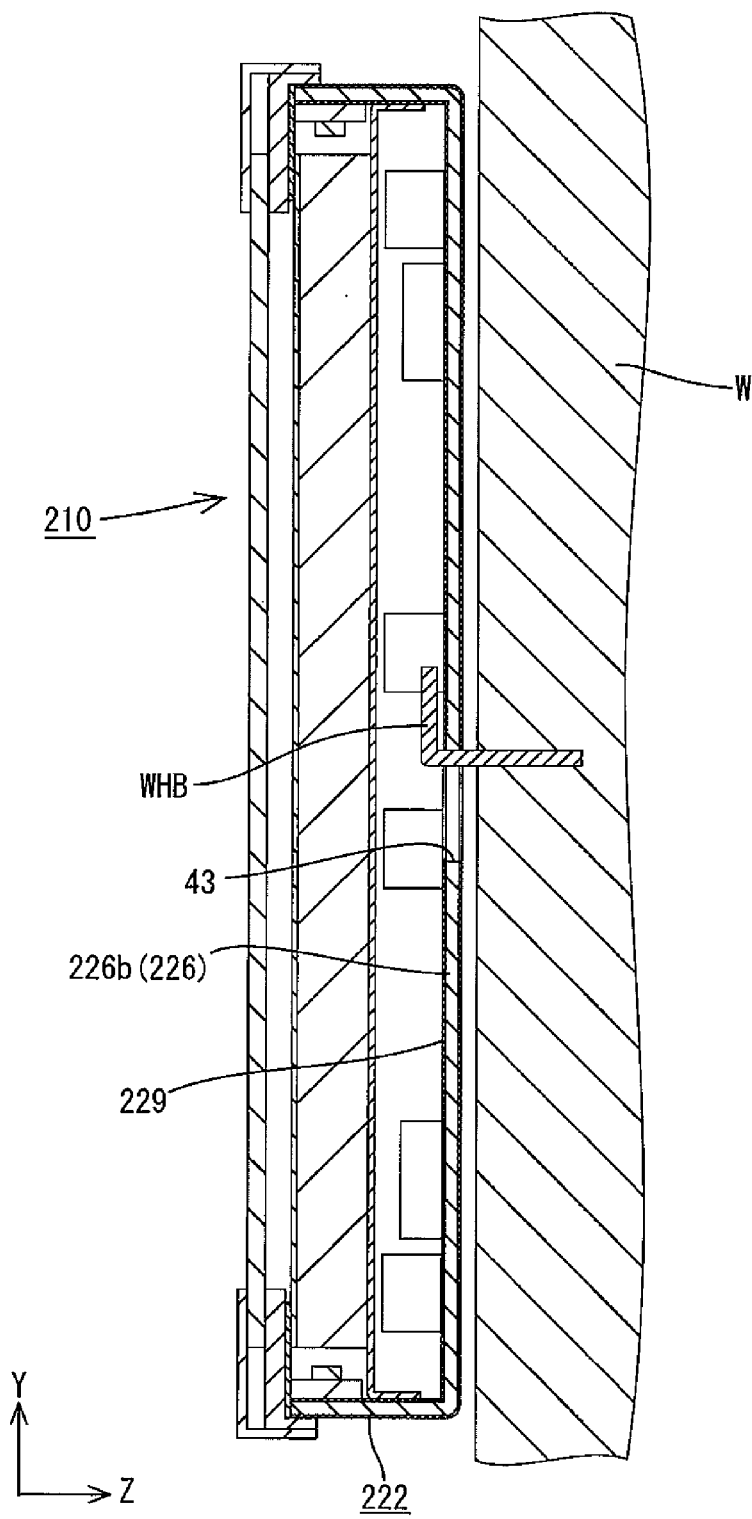
FIG. 14 is a cross-sectional view taken along line xiv-xiv of FIG. 13.

As illustrated in FIGS. 13 and 14, the duct member 222 of this embodiment have hanging holes 43 in which the wall-hook brackets WHB are fit. The wall-hook brackets WHB are used to hang the liquid crystal display device 210 on a wall. Upper sides and lower sides in FIGS. 13 and 14 correspond to the upper and lower sides in the vertical direction. The hanging holes 43 are formed in a pair of second duct portions 229 of the duct member 222. Specifically, the hanging holes 43 run through second bottom wall portions 226*b* of the second duct portions 229 in a plate thickness direction of the second bottom wall portions 226b. The hanging hole 43 includes a rectangular hole and a round hole in a plan view that are continuous to each other. The rectangular hole is on the upper side in the vertical direction and the round hole is on the lower side in the vertical direction. The wall-hook brackets WHB are mounted on a wall W where a liquid crystal display device 210 is to be put. Tips of the wall-hook brackets WHB protrude from a wall surface of the wall W such that the wall-hook brackets WHB are fit in the hanging holes 43.

Similar to the first embodiment, the duct member 222 is formed of a composite plate 237 and thus the liquid crystal display device 210 is reduced in weight as a whole. Accordingly, the liquid crystal display device 210 can be put on a wall with an easy configuration in which the wall-hook brackets WHB are inserted in the hanging holes 43 of the bracket 222. Further, a bottom wall 226 that has the hanging holes 43 protrudes toward the rear side further than an LED drive board 224 and a control board 225 (see FIG. 6). The bottom wall 226 of this embodiment is the rear-most portion of the liquid crystal display device 210, that is, the bottom wall 226 is positioned closest to the wall W in the liquid crystal display device 210. The bottom wall 226 is seen from the rear side and configured as an exterior appearance of the liquid crystal display device 210. Therefore, by forming the hanging holes 43 in the bottom wall 226, the wall-hook brackets WHB are easily inserted in the hanging holes 43. Further, the length of the wall-hook brackets WHB that projects from the wall surface of the wall W can be reduced.

Fourth Embodiment

A fourth embodiment of this invention will be described with reference to FIG. 15. In the fourth embodiment, a chassis 314 is formed of a composite plate 44. The same structures, operations, and effects as those of the first embodiment will not be described.

Figure 15:
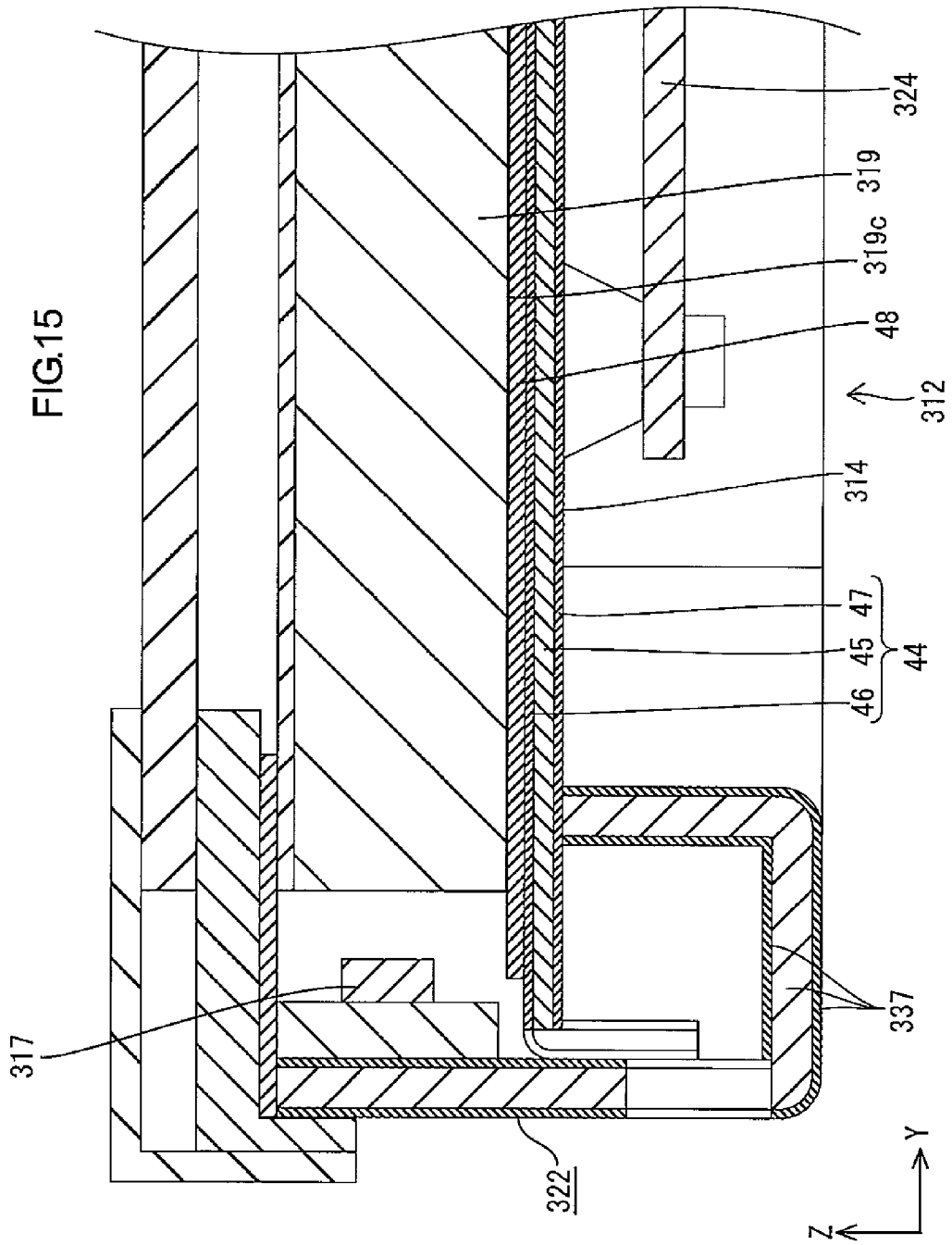
FIG. 15 is a cross-sectional view of a liquid crystal display panel according to a fourth embodiment of this invention taken along a short-side direction thereof, illustrating a cross section taken along a second duct portion of a duct member.

As illustrated in FIG. 15, the chassis 314 of this embodiment is formed of the composite plate 44. The composite plate 44 configured as the chassis 314 is similar to a composite plate 337 configured as a duct member 322. The composite plate 44 includes a resin core 45 and a pair of metal plates 46 and 47 that sandwich the resin core 45. The resin core 45 is a plate-like member made of foamed resin. The metal plates 46 and 47 are thin plate-like member made of aluminum. Configurations of the composite plate 44 will not be described in detail since the composite plate 44 has a structure similar to the composite plate 337 configured as the duct member 322. An LED drive board 324 and a control board (not illustrated) are directly attached to the metal plate 47 that is an outer metal plate of the composite plate 44. A light guide plate 319 is placed on the metal plate 46 that is on an inner side via a second reflecting sheet 48, which will be described later. In this configuration, if heat generated from the LED drive board 324 and the control board propagates to the chassis 314, most of the heat is dissipated over the outer metal plate 47 of the chassis 314 and less likely to propagate to the inner metal plate 46 that is insulated by the resin core 45. Therefore, a temperature of the light guide plate 319 that is supported by the inner metal plate 46 is less likely to be increased due to the heat generated from the LED drive board 324 and the control board. Accordingly, thermal expansion is less likely to occur in the light guide plate 319 and thus deformation such as warping is less likely to occur.

The chassis 314 of this embodiment is formed of the composite plate 44 and does not have a light reflecting function unlike the chassis 14 of the first embodiment. Therefore, according to this embodiment, the second reflecting sheet 48 is arranged between the chassis 314 and the light guide plate 319. Light that propagates through the light guide plate 319 is reflected by the second reflecting sheet 48 and directed toward the front side. The second reflecting sheet 48 is similar to the first reflecting sheet 320.

In the above-described embodiment, the chassis 314 is formed of the composite plate 44 including the plate-like resin core 45 and a pair of the metal plates 46 and 47 that sandwich the resin core 45 from the front and rear sides. According to this configuration, the chassis 314 is lighter in weight compared to a chassis made of a metal plate. Further, the composite plate 44 of the chassis 314 has high heat insulation properties. Therefore, even if heat transferred from LEDs 317 to the duct member 322 is transferred to the chassis 314, the heat is less likely to be transferred to the light guide plate 319. Thus, a temperature of the light guide plate 319 is less likely to be increased due to heat from the LEDs 317.

The duct member 322 is arranged so as to cover a portion of the chassis 314. The LED drive board (light source drive board) 324 is arranged on a side of the chassis 314 opposite from a light exit portion side so as to be adjacent to the duct member 322. The LED drive board 324 is configured to supply power to the LEDs 317. In this configuration, the duct member 322 and the LED drive board 324 are arranged adjacent to each other on the opposite side of the chassis 314 from the light exit portion side. Therefore, a backlight unit 312 is decreased in thickness compared to a configuration in which the LED drive board 324 is mounted on a surface of the duct member opposite from the chassis 314. Further, the chassis 314 is formed of the composite plate 44 having high thermal insulation properties. According to this configuration, heat generated from the LED drive board 324 mounted on the chassis 314 is less likely to be transferred to the light guide plate 319 via the chassis 314. Therefore, a temperature of the light guide plate 319 is less likely to be increased due to heat from the LED drive board 324.

Fifth Embodiment

A fifth embodiment of this invention will be described with reference to FIG. 16. In the fifth embodiment, a chassis 414 is a metal plate 49. The same structures, operations, and effects as those of the first embodiment will not be described.

Figure 16:
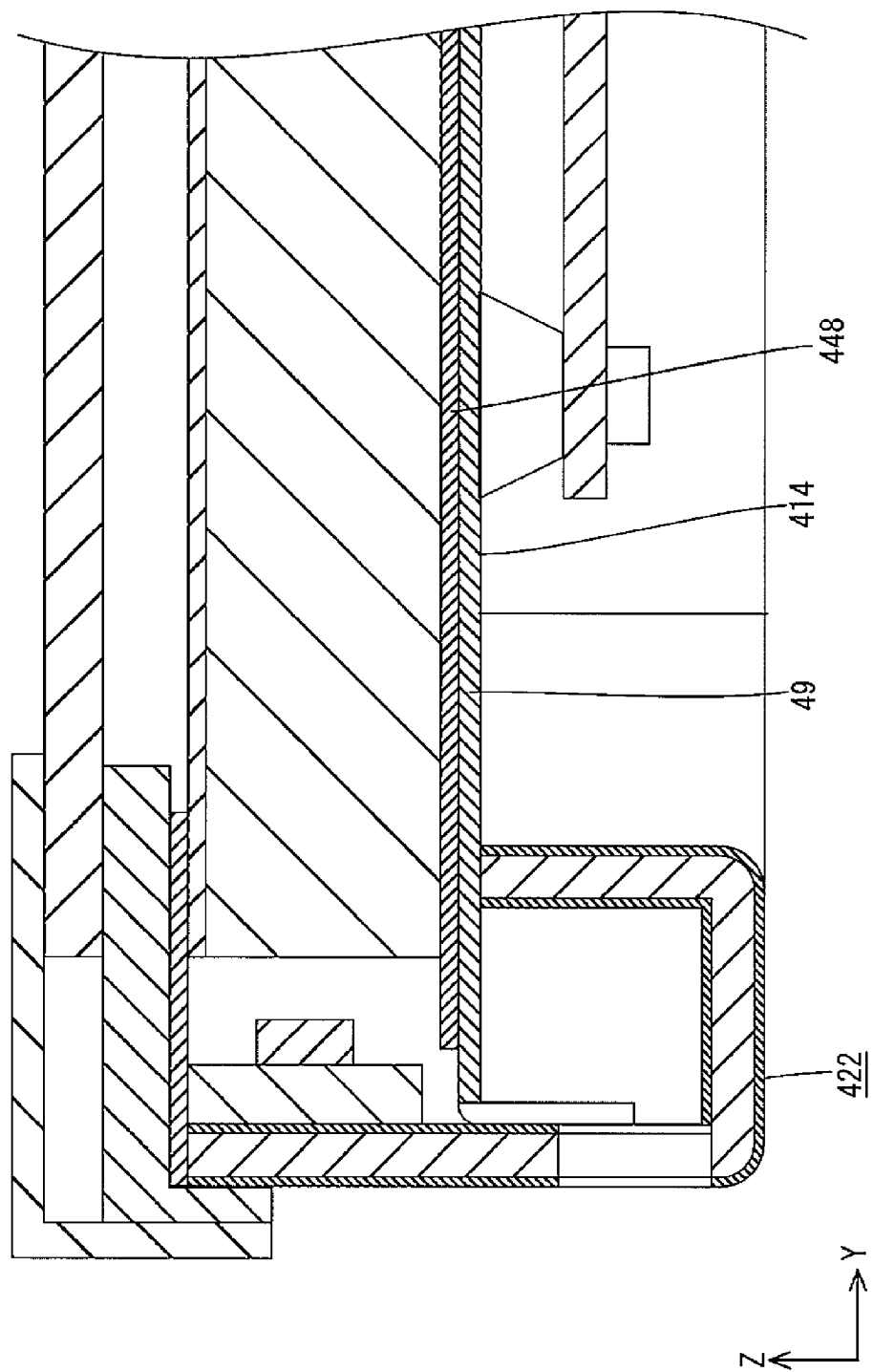
FIG. 16 is a cross-sectional view of a liquid crystal display panel according to a fifth embodiment of this invention, illustrating a cross section taken along a second duct portion of a duct member.

As illustrated in FIG. 16, the chassis 414 of this embodiment is the metal plate 49. The metal plate 49 configured as the chassis 414 is made of aluminum. Similar to the above-described chassis 414 of the first embodiment, the chassis 414 is supported by a duct member 422 that is arranged on a rear side of the chassis 414 and thus mechanical strength of the chassis 414 is reinforced. Therefore, the chassis 414 does not necessarily have a high rigidity. According to this configuration, the metal plate 49 that is the chassis 414 of this embodiment may be a thin plate-like member having a thickness equal to or less than 0.5 mm, for example. Accordingly, weight of the chassis 414 is reduced. In this embodiment, the chassis 414 is the metal plate 49 that does not have a light reflecting function. Therefore, similar to the fourth embodiment, a second reflecting sheet 448 is disposed on the chassis 414.

Sixth Embodiment

A sixth embodiment of this invention will be described with reference to FIGS. 17 to 19. In the sixth embodiment, a duct member 522 includes receiving portions 50 to receive a chassis 514. The same structures, operations, and effects as those of the first embodiment will not be described.

Figure 17:
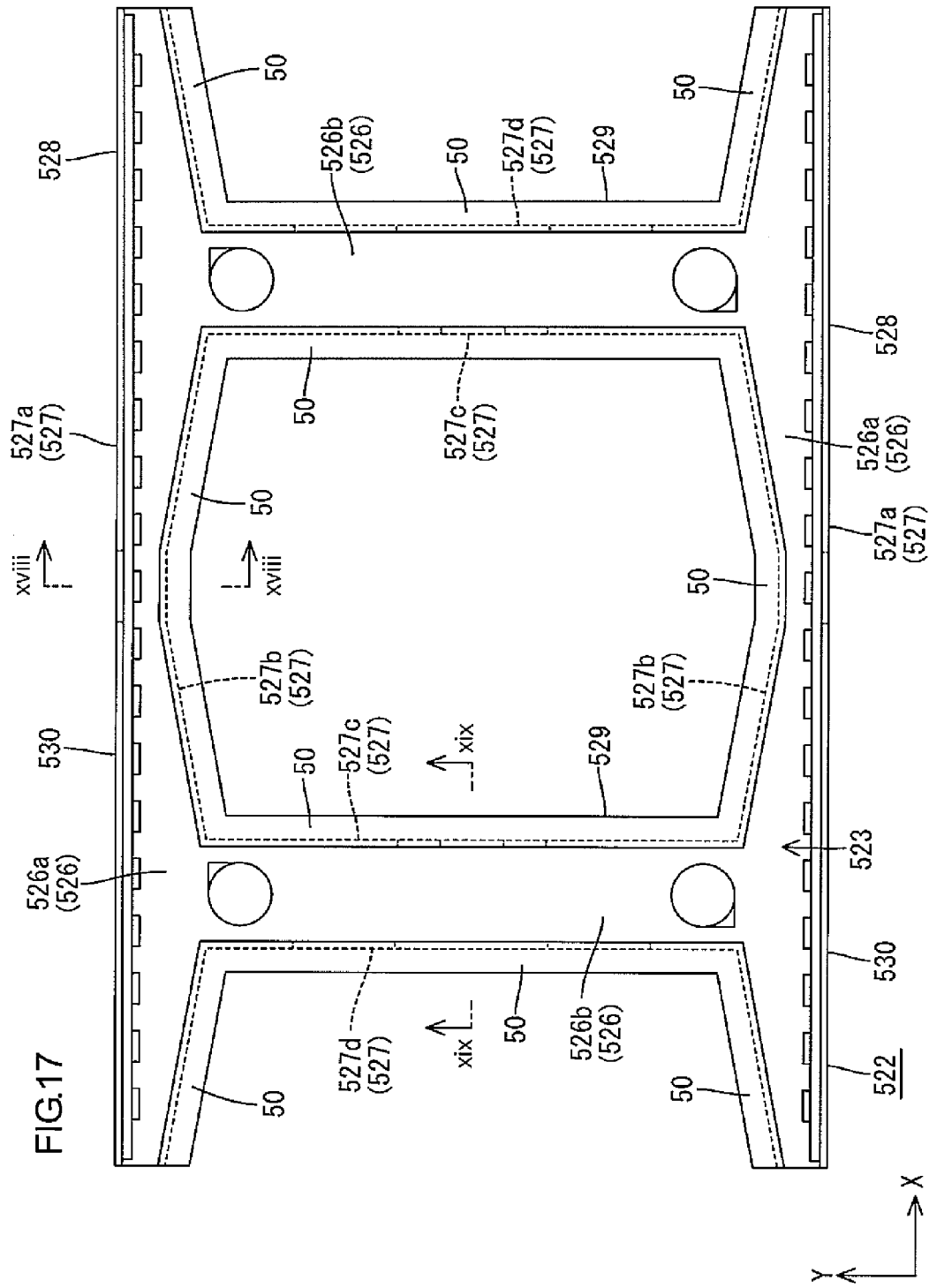
FIG. 17 is a plan view illustrating an arrangement configuration of a duct member, LED boards, and fans according to a sixth embodiment of this invention.
Figure 18:
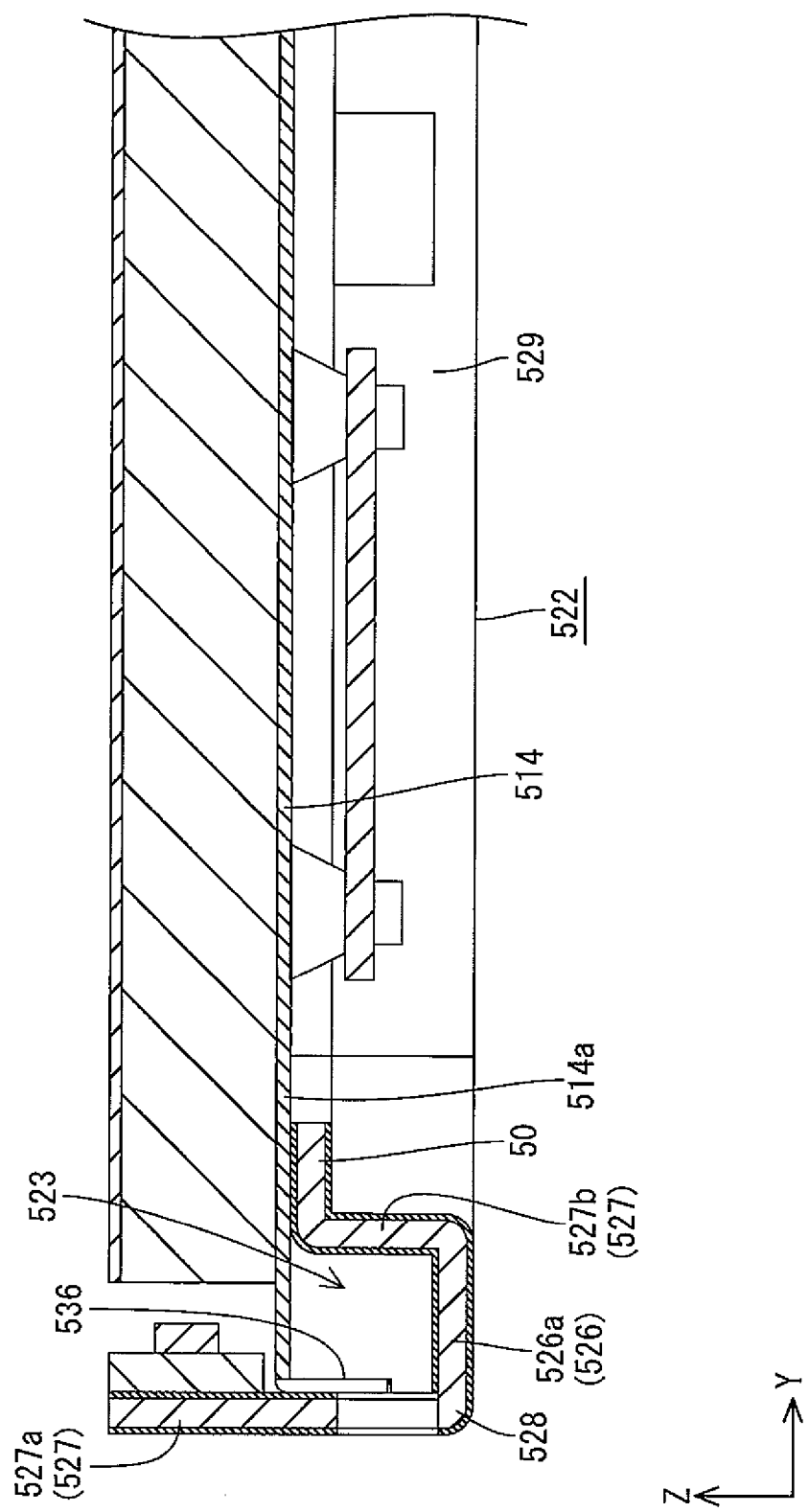
FIG. 18 is a cross-sectional view taken along line xviii-xviii of FIG. 17.
Figure 19:
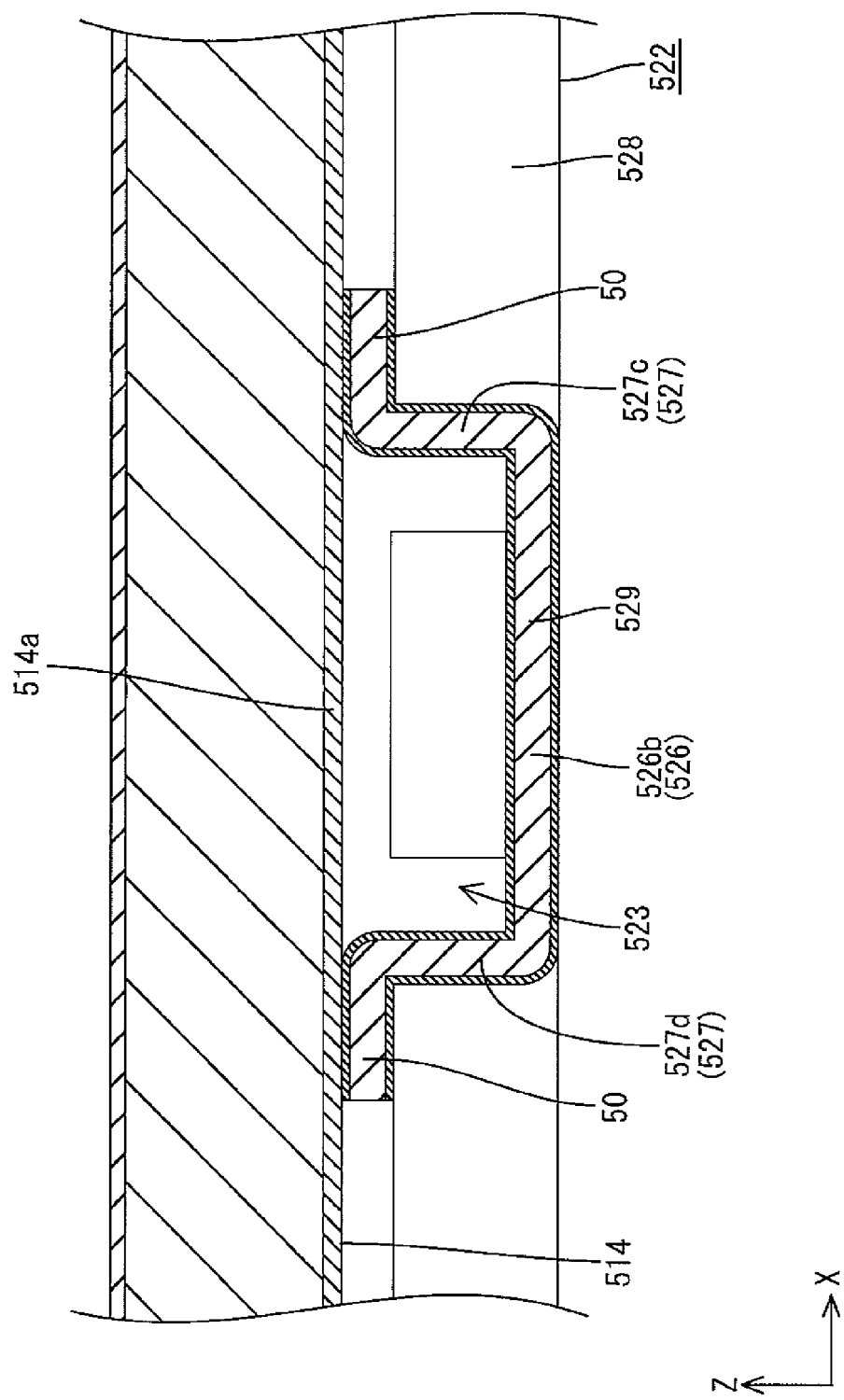
FIG. 19 is a cross-sectional view taken along line xix-xix of FIG. 17.

As illustrated in FIGS. 17 to 19, the duct member 522 according to this embodiment includes sidewalls 527. Some of the sidewalls 527 include the receiving portions 50 that receive a bottom plate 514a of the chassis 514 from the rear side. Each sidewall 527 protrudes from a bottom wall 526 of the duct member 522 and has a distal end portion. Each receiving portion 50 is a plate piece that is bent from the distal end portion of the corresponding sidewall 527. Plate surfaces of the receiving portion 50 are parallel to the bottom plate 514a of the chassis 514. Among the sidewalls 527, the sidewalls 527 having the distal end portions that are opposite the bottom plate 514a include the receiving portions 50. Specifically, an inner first sidewall portion 527b of each of the first duct portions 528 and second sidewall portions 527c and 527d of each of the second duct portions 529 include the receiving portions 50. Outer first sidewall portions 527a (dissipative LED attachment portions 530) do not include the receiving portions 50. The receiving portions 50 extend along the sidewall portions 527b, 527c, and 527d over the entire lengths. A front plate surface of each receiving portion 50 is in surface-contact with a rear plate surface of the bottom plate 514a and fixed thereto by welding or screws. As a result, the receiving portions 50, together with fixing pieces 536 of the chassis 514, can establish a stable attachment relationship between the chassis 514 and the duct member 522.

Seventh Embodiment

Figure 21:
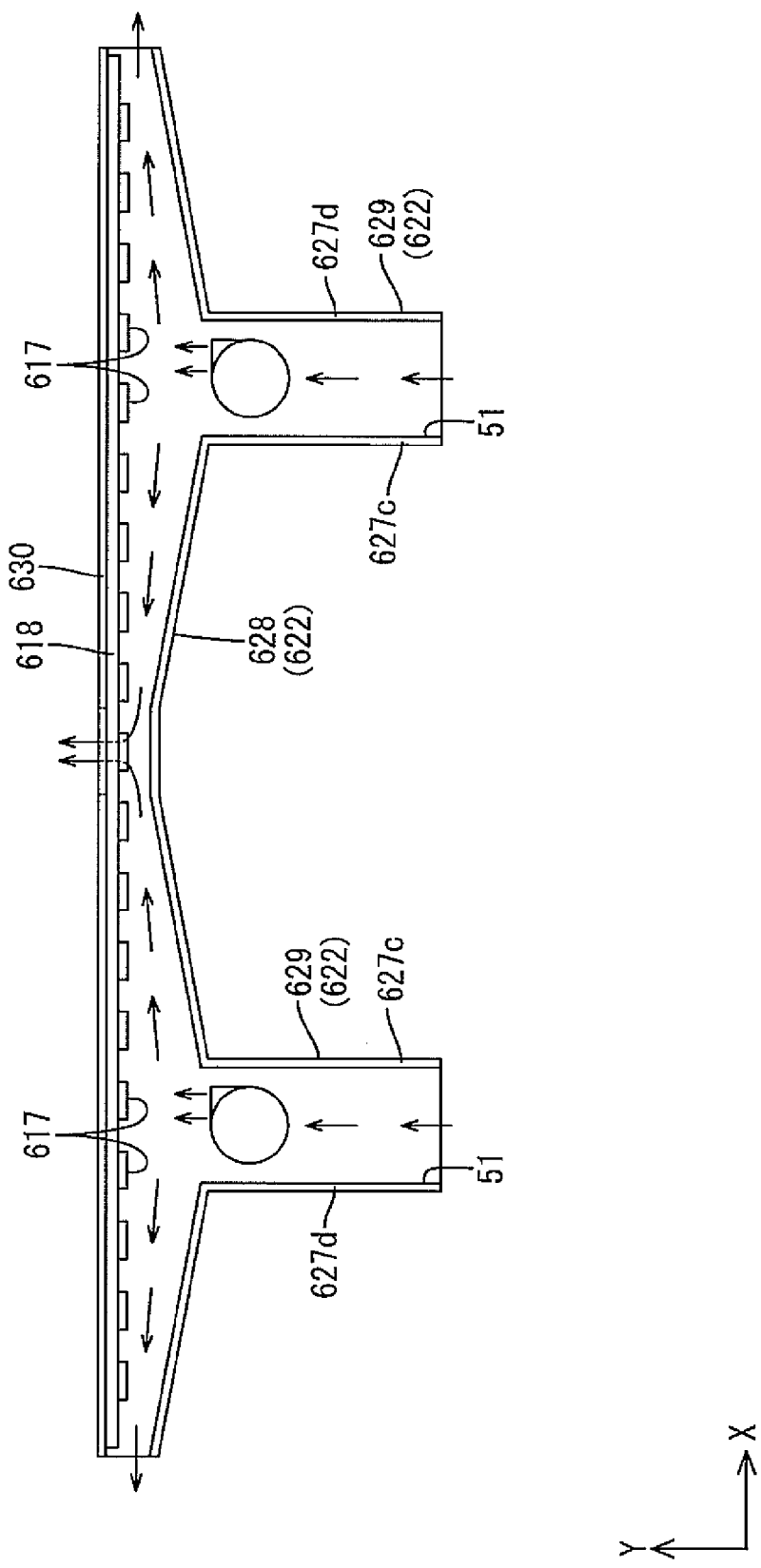
FIG. 21 is a plan view illustrating an arrangement configuration of a duct member, LED boards, and fans.
Figure 22:
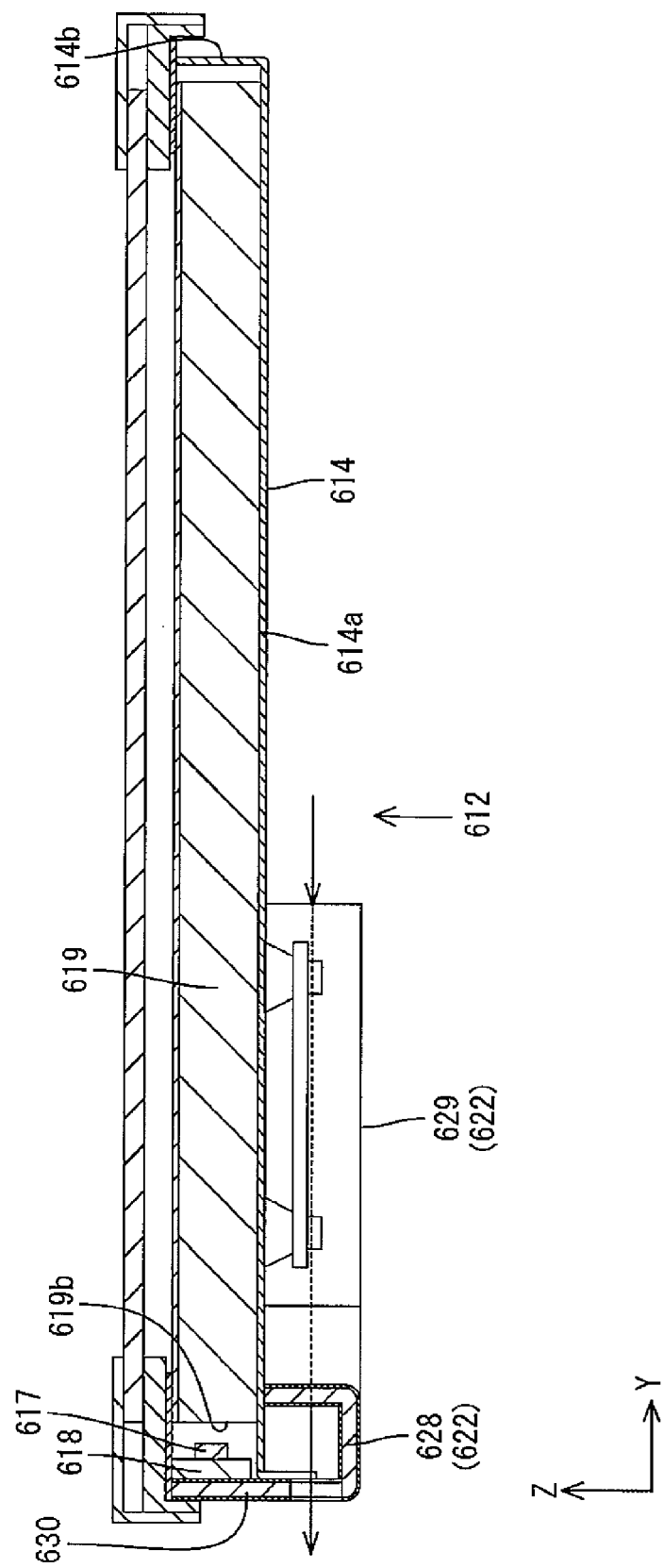
FIG. 22 is a cross-sectional view taken along line xxii-xxii of FIG. 21.

A seventh embodiment of this invention will be described with reference to FIGS. 20 to 22. In the seventh embodiment, an LED 618 is disposed on one side of a light guide plate 619, and accordingly, configurations of a duct member 622 and a chassis 614 are altered. The same structures, operations, and effects as those of the first embodiment will not be described.

Figure 20:
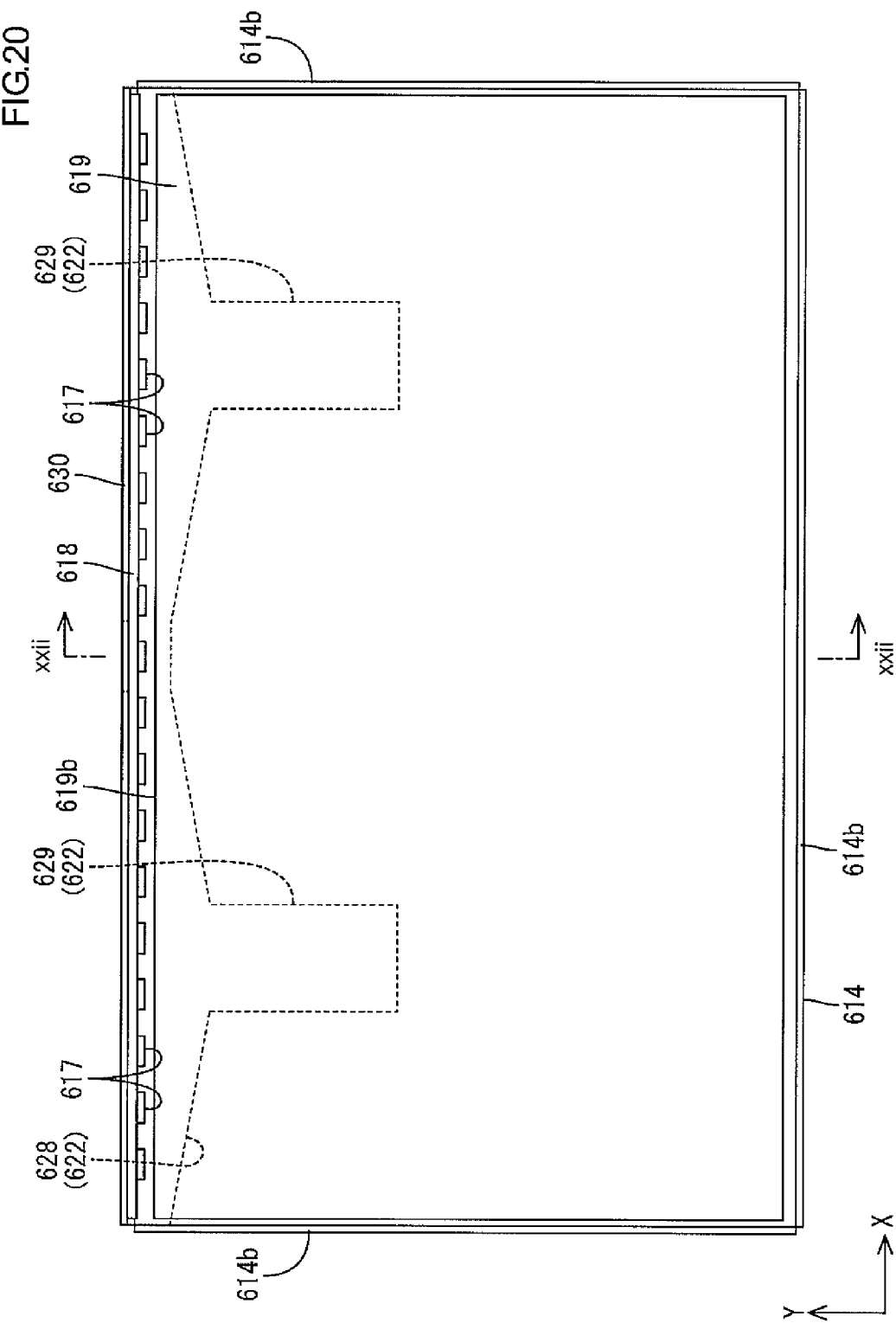
FIG. 20 is a plan view illustrating an arrangement configuration of a chassis, a duct member, a light guide plate, and an LED board according to a seventh embodiment of this invention.

As illustrated in FIG. 20, the LED board 618 according to this embodiment is arranged so as to be opposite one of long-side surfaces (a light entrance surface 619b) of the light guide plate 619 on an upper side in FIG. 20. As illustrated in FIGS. 21 and 22, the duct member 622 includes a first duct portion 628 and a pair of second duct portions 629. The first duct portion 628 includes a dissipative LED attachment portion 630 on which the LED board 618 is mounted. Each of the second duct portions 629 are connected to the first duct portion 628. The second duct portion 629 has end portions in an extending direction (the Y-axis direction) thereof. One of the end portions is connected to the first duct portion 628. The other one of the end portions opens to the outside. The other end portion is an inlet 51 through which external air flows in. The second duct portion 629 includes second sidewall portions 627c and 627d. The sidewall portions 627c and 627d do not include the inner inlet 34 or the outer inlet 35 as in the first embodiment. A configuration of the first duct portion 628 is similar to the configuration of the first embodiment. With the duct member 622 having such a configuration, heat from LEDs 617 that are collectively arranged in one end portion of a backlight unit 612 can be efficiently cooled down. Further, a reduction in size or weight of the duct member 622 can be achieved. As illustrated in FIGS. 20 and 22, the chassis 614 includes a bottom plate 614a and side plates 614b. The bottom plate 614a has peripheral end portions. The side plates 614b protrude from three of peripheral end portions that do not face the LED board 618 (a dissipative LED attachment portions 630).

Eighth Embodiment

An eighth embodiment of this invention will be described with reference to FIGS. 23 and 24. In the eighth embodiment, arrangement of a pair of LED boards 718 is changed, and accordingly, configurations of a duct member 722 and a chassis 714 are altered. The same structures, operations, and effects as those of the first embodiment will not be described.

Figure 23:
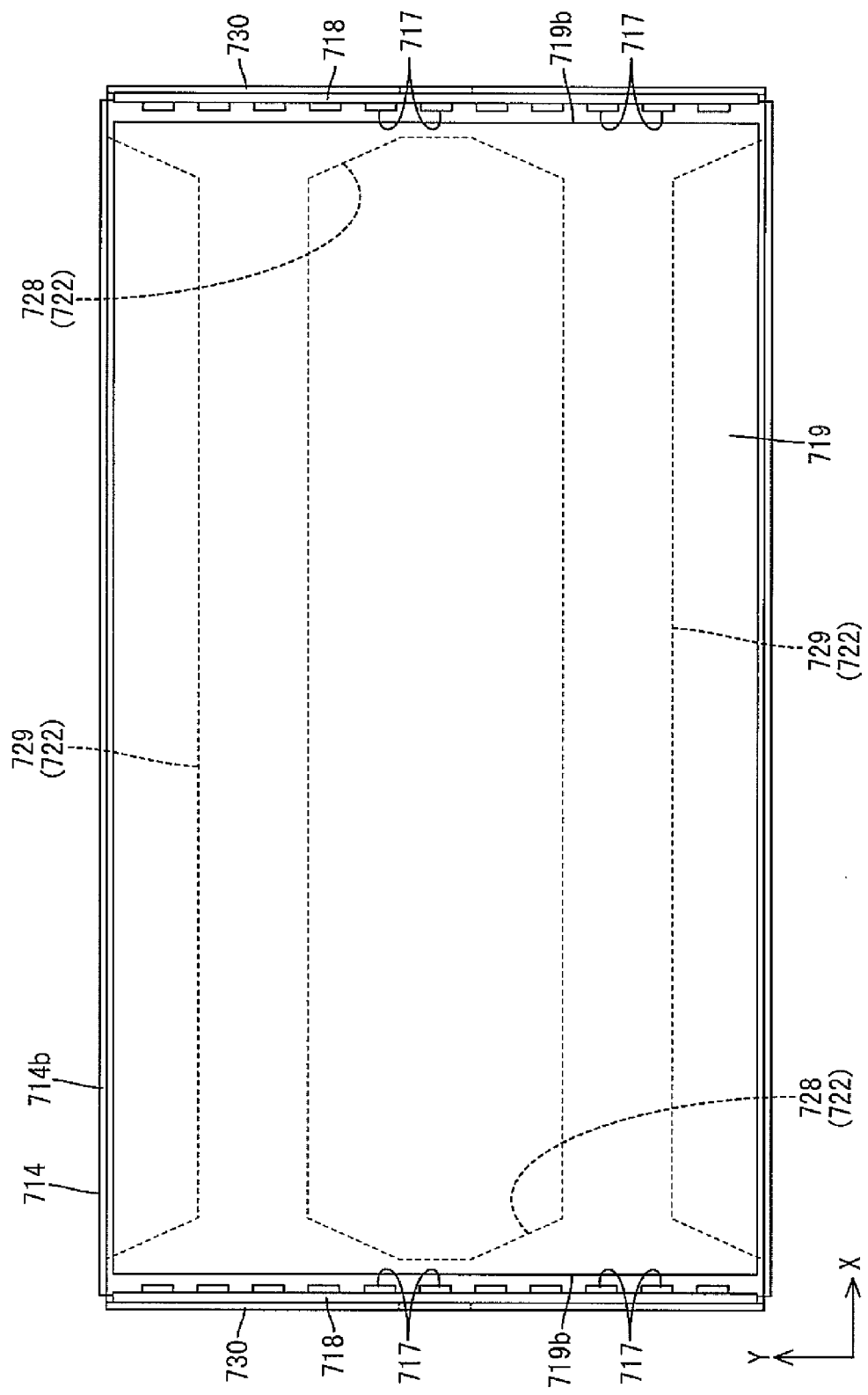
FIG. 23 is a plan view illustrating an arrangement configuration of a chassis, a duct member, a light guide plate, and LED boards according to an eighth embodiment of this invention.
Figure 24:
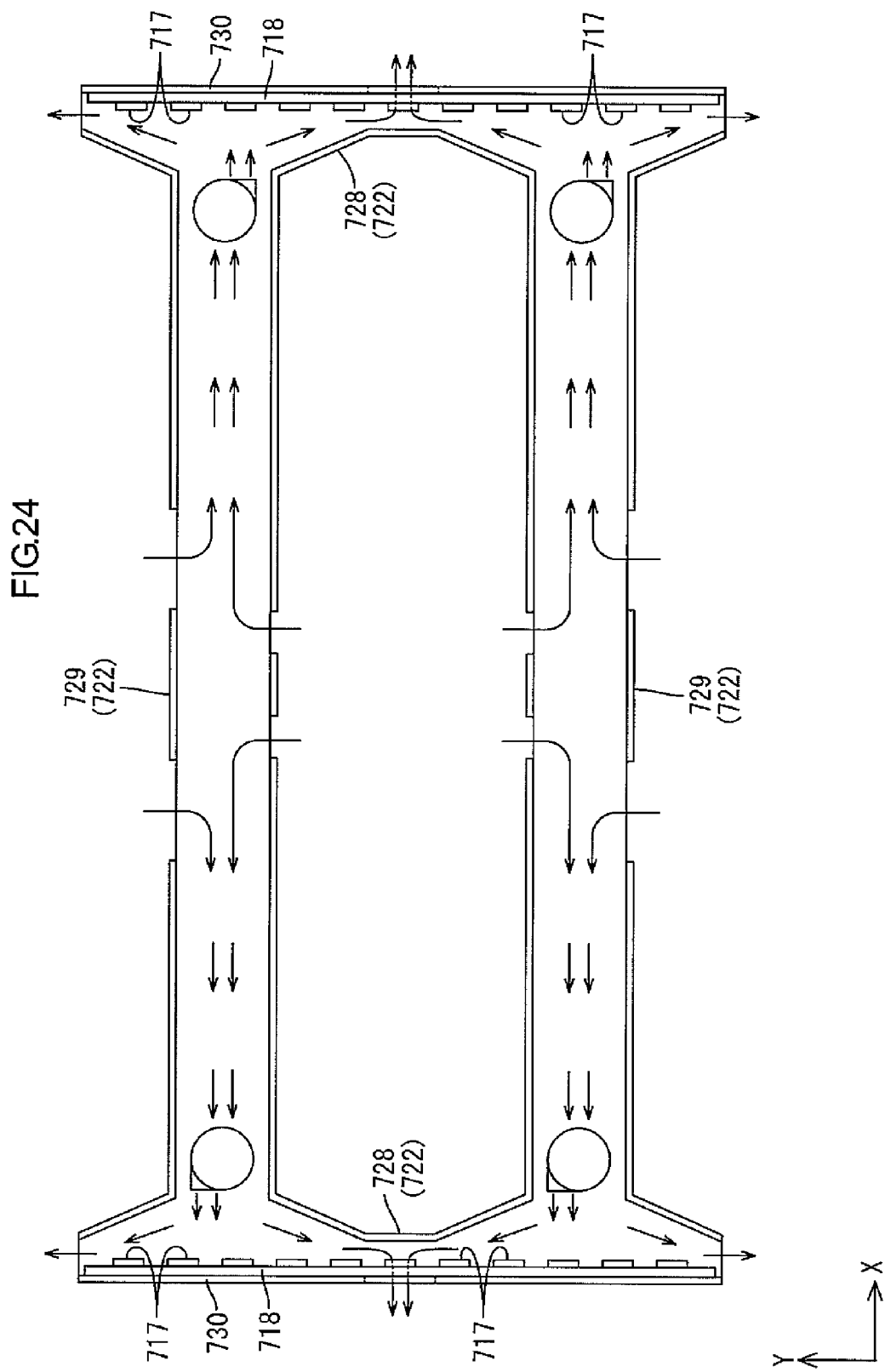
FIG. 24 is a plan view illustrating an arrangement configuration of a duct member, LED boards, and fans.

As illustrated in FIG. 23, the LED boards 718 of this embodiment are arranged on sides of a light guide plate 719 with respect to a long-side direction (X-axis direction) so as to sandwich the light guide plate 719 in between. Each of the LED boards 718 extends along a short-side direction (Y-axis direction) of the light guide plate 719. Multiple LEDs 717 are arranged along an extending direction of the LED board 718. Among end surfaces of the light guide plate 719, a pair of end surfaces along the short-side direction of the light guide plate 719 is a light entrance surface 719b. As illustrated in FIG. 24, the duct member 722 includes a pair of first duct portions 728. Each of the first duct portions 728 extends along the extending direction of the LED board 718, that is, along the Y-axis direction. Each first duct portion 728 includes a dissipative LED attachment portion 730 that is arranged along an extending direction of the first duct portion 728. The duct member 722 includes a pair of second duct portions 729. Each second duct portions 729 extends in a direction perpendicular to the extending direction of the first duct portion 728, i.e. in the X-axis direction. End portions of each second duct portion 729 are connected to the respective first duct portions 728. In this embodiment, the LED boards 718 and the duct member 722 are arranged at positions rotated by 90 degrees with respect to the arrangement in the first embodiment in a plan view. However, the same operations and effects as those of the first embodiment can be obtained. As illustrated in FIG. 23, the chassis 714 includes side plates 714b in pairs arranged on long sides thereof.

Ninth Embodiment

A ninth embodiment of this invention will be described with reference to FIGS. 25 and 26. In the ninth embodiment, the number and arrangement of second duct portions 828 of a duct member 822 are altered. The same structures, operations, and effects as those of the first embodiment will not be described.

As illustrated in FIG. 25, the duct member 822 according to this embodiment includes two first duct portions 828 and one second duct portion 829 connected to the first duct portions 828. Ends of the second duct portion 829 are connected to the respective first duct portions 828 at substantially middle portions thereof in their extending direction. The duct member 822 has an H-like shape as a whole in a plan view. The second duct portion 829 is arranged in a substantially middle area of a chassis 814 in a long-side direction of the chassis 814 (see FIG. 26). The second duct portion 829 includes a pair of second sidewalls 827c and 827d. Each of the second sidewalls 827c and 827d includes an inlet 52 at a substantially middle part of the second sidewalls 827c and 827d in an extending direction. Each of the first duct portions 828 is tapered from a connection portion with the second duct portion 829 toward edge inlets 832 disposed at ends of the first duct portion 828. Namely, inner first sidewall portions 827b of each first duct portion 828 are tapered portions 827b1. The first duct portion 828 does not include the middle outlet 33 that is included in the first embodiment. According to the configuration change of the duct member 822 as described above, arrangement of an LED drive board 824 and a control board 825 is changed. Specifically, as illustrated in FIG. 26, positions of the LED drive board 824 and the control board 825 in the X-axis direction are different from the second duct portion 829. Further, positions of the LED drive board 824 and the control board 825 in the Y-axis direction are different from the inlets 52 of the second duct portion 829 (see FIG. 25).

Other Embodiments

The scope of this invention is not limited to the embodiments described in the above description with reference to the drawings. The following embodiments may be included in the technical scope of this invention, for example.

(1) In each of the above embodiments, the cabinets made of synthetic resin sandwich the liquid crystal display device from the front and rear sides. However, the cabinets may be omitted. In such a configuration, the bezel and the duct member are exposed to the outside and configured as exterior members and therefore external objects may directly contact the bezel and the duct member. In each of the above embodiments, since the duct member is formed of a composite plate material, heat is less likely to propagate to the bezel and thus a temperature of the bezel is less likely to be increased. Namely, a temperature of the outer metal plate of the duct member is less likely to be increased. Accordingly, even when an external object directly contacts with the bezel or the duct member, troubles are less likely to occur. In a configuration without the cabinets, only the front cabinet may be omitted and a part of the rear cabinet may be included in the device (a portion to cover the control boards and the LED drive boards) while the other part of the rear cabinet may be omitted.

(2) In the first embodiment, the chassis is made of foamed polyethylene terephthalate having a white color. The foamed polyethylene terephthalate is one kind of foamed resin material. However, the chassis may be formed of a non-foamed resin plate. The non-foamed resin plate for the chassis may be formed of a plate member that is made by mixing synthetic resin and barium sulfate as a white material. Instead of barium sulfate, magnesium oxide may be used as a white material.

(3) In the first embodiment, the chassis is made of foamed polyethylene terephthalate having a white color. The foamed polyethylene terephthalate is one kind of foamed resin material. However, the chassis may be formed of a non-foamed resin plate that includes a surface having a color different from white. In such a configuration, it is preferable to use the second reflecting sheets described in the fourth and fifth embodiments.

(4) In the other embodiment (3), the surface of the chassis made of non-foamed resin material may be coated with a white coating material that includes barium sulfate or magnesium oxide as a white material. Accordingly, the second reflecting sheet may be omitted.

(5) In the first embodiment, the chassis is made of foamed polyethylene terephthalate having a white color, which is one kind of foamed resin material. However, the chassis may be made of a foamed resin material other than the foamed PET, such as foamed polycarbonate (foamed PC) having a white color.

(6) In the second embodiment, the thermal conductive member (the graphite sheet) is attached to the duct member so as to cover the entire area of the dissipative LED attachment portion. However, the thermal conductive member may cover a portion of the dissipative LED attachment portion. Further, the thermal conductive member may cover a portion other than the dissipative LED attachment portion.

(7) In the second embodiment, a graphite sheet is used as the thermal conductive member. However, the thermal conductive member may be made of any materials other than the graphite sheet as long as the material has a higher thermal conductivity than the duct member (the metal plate).

(8) In the third embodiment, the hanging holes are formed in the second bottom wall portions of the second duct members. However, the hanging holes may be formed in the first bottom wall portions of the first duct members. The number and the arrangement of the hanging holes may be altered as appropriate.

(9) In each of the fourth and fifth embodiments, the surface of the chassis may be coated with a white coating material (such as a coating material including barium sulfate or magnesium oxide as a white material). Accordingly, the second reflecting sheet may be omitted.

(10) In each of the above embodiments, the material of the metal plates of the composite plate is aluminum. However, other material such as iron, stainless, Galvalume, or titanium may be used.

(11) In each of the above embodiments, foamed synthetic resin is used as a material for the resin core of the composite plate. However, other material such as non-foamed resin material (non-foamed polyethylene) may be used.

(12) In each of the above embodiments, the LED attachment portion and the heat dissipation portion included in the dissipative LED attachment portion continues to each other without steps. However, the LED attachment portion may continue to the heat dissipation portion via a bent portion. Specifically, the LED attachment portion may be arranged outward from the heat dissipation portion and a bent portion may connect the LED attachment portion and the heat dissipation portion.

(13) In each of the above embodiments, the LED attachment portion and the heat dissipation portion included in the dissipative LED attachment portion has the same dimension in length. However, the LED attachment portion and the heat dissipation portion may have different dimensions in length. In such a case, the LED attachment portion may be shorter than the heat dissipation portion and vice versa.

(14) In each of the above embodiments, the LED attachment portion of the dissipative LED attachment portion has a length over the entire length of the LED board. However, the LED attachment portion may have a length shorter than the entire length of the LED board. In such a case, multiple LED attachment portions may be attached to an LED board.

(15) In each of the above embodiments, the heat dissipation portion of the dissipative LED attachment portion has a length over the entire length of the duct member. However, the heat dissipation portion may have a length shorter than the entire length of the duct member. In such a case, multiple heat dissipation portions may be arranged so as to face an air passage.

(16) In each of the above embodiments, the duct member has a substantially hollow shape that opens to the chassis side. However, the duct member may have a hollow shape that does not open to the chassis side. Specifically, the duct member may include a bottom wall, a pair of sidewalls, and a top wall. The side walls protrude from the bottom wall. The protruded ends of the sidewalls are connected to the top wall. The top wall is opposite the bottom wall. The top wall may be attached to the bottom plate of the chassis.

(17) The arrangement or the number of the second duct portions with respect to the first duct portion of the duct member in each of the above embodiments may be altered as appropriate. For example, the second duct portions may be connected at ends of the first duct portion in the extending dimension of the first duct portion, or three or more second duct portions may be connected to the first duct portion.

(18) The plan-view shapes of the first duct portion and the second duct portion of the duct member, or the shapes of the bottom wall and the sidewall in each of the above embodiments may be altered as appropriate.

(19) The arrangement, the number, the shape, or the size (an opening area) of the inlet and the outlet of the duct member in each of the above embodiments may be altered as appropriate.

(20) The arrangement, the shape, or the size of the LED drive board and the control board in each of the above embodiments may be altered as appropriate. If other boards other than the LED drive board and the control board are attached to a rear surface of the chassis, the boards may be arranged according to the above embodiments.

(21) In each of the above embodiments, the positions (orientations of the blowing port and the intake port) of the fan may be reversed. In such a configuration, the inlets of the duct member in each of the above embodiments may be used as the outlets, and the outlets of the duct member in each of the above embodiments may be used as the inlets. Even in such a configuration, heat from the LEDs can be dissipated via the dissipative LED attachment portion and thus adequate heat dissipation performance can be obtained.

(22) In each of the above embodiments, the fans disposed in the duct member is sirocco fans. However, other types of fan (e.g. propeller fans or turbo fans) may be used.

(23) In each of the above embodiments, the fans are disposed in the duct member to forcibly intake and exhaust air. However, fans may be omitted in silence-oriented models.

(24) The arrangement and the number of the fans arranged within the duct member in each of the above embodiments may be altered as appropriate.

(25) In each of the above embodiments, the fixing pieces of the chassis are arranged opposite the blowing ports of the respective fans. However, the fixing pieces may be arranged so as not to be opposite the blowing ports.

(26) In the above seventh embodiment, the LED board is arranged adjacent to one of the long-side end portions of the light guide plate. However, the LED board may be arranged adjacent to one of short-side end portions of the light guide plate. In such a configuration, the arrangement of the dissipative LED attachment portion of the duct member and the arrangement of the side plate of the chassis may be altered according to the arrangement change of the LED board.

(27) The LED boards in each of the above embodiments may be arranged opposite the three end portions of the light guide plate, or all of the four end portions of the light guide plate. In such a configuration, the arrangement of the dissipative LED attachment portion of the duct member and the arrangement of the side plate of the chassis may be altered according to the arrangement change of the LED boards. In particular, if the LED boards are arranged opposite the four sides of the light guide plate, the chassis may not include the side plates.

(28) In each of the above embodiments, one LED board is arranged on one side of the light guide plate. However, two or more LED boards may be arranged on one side of the light guide plate.

(29) In each of the above embodiments, the edge-light backlight unit including the light guide plate is used. However, this invention may be applied to an edge-light backlight unit without a light guide plate. In such an edge-light backlight unit, optical lenses (for example, diffuser lenses having diffusing effect) may be used instead of the light guide plate 19 and optical effects may be applied to light emitted from LEDs. With this configuration, light emitted from the LEDs that are collectively arranged at an end of a chassis is directed toward a light exit portion of the chassis such that light is evenly applied to an entire area of a plate surface a liquid crystal panel.

(30) In the above embodiments, the color filter includes color portions in three colors. However, the color filter may include color portions in four colors with a yellow color in addition to red, green, and blue colors.

(31) In each of the above embodiments, the LEDs are used as light sources. However, other types of light sources such as organic ELs may be used.

(32) In each of the above embodiments, the liquid crystal panel and the chassis are set in the vertical position with the short-side directions thereof correspond to the vertical direction. However, the liquid crystal panel and the chassis may be set in the vertical position with long-side directions thereof correspond to the vertical direction.

(33) In each of the above embodiments, the TFTs are used as switching components of the liquid crystal display device. However, the technology described herein can be applied to liquid crystal display devices using switching components other than TFTs (e.g. thin film diodes (TFDs)). Furthermore, the technology can be applied to black-and-white liquid crystal display devices other than the color liquid crystal display device.

(34) In each of the above embodiments, the liquid crystal display device including the liquid crystal panel as a display panel is used. However, this invention can be applied to display devices including other types of display panels.

(35) In each of the above embodiments, the television device including the tuner is used. However, this invention can be applied to a display device without a tuner. Specifically, this invention can be applied to liquid crystal display devices used for digital signage or electric blackboards.

EXPLANATION OF SYMBOLS

10, 210: liquid crystal display device (display device), 11: liquid crystal panel (display panel), 12, 312, 612: backlight unit (lighting device), 14, 314, 414, 614, 714, 814: chassis, 14a, 614a: bottom plate, 14c: light exit portion, 17, 117, 317, 617, 717: LED (light source), 19, 319, 619, 719: light guide plate (light guide member), 22, 122, 222, 322, 422, 522, 622, 722, 822: duct member, 23, 123, 523: air passage, 24, 224, 824: LED drive board (light source drive board), 26, 226, 526: bottom wall, 27, 527: sidewall, 28, 228, 428, 528, 528, 628, 728: first duct portion, 29, 129, 229, 529, 629, 729: second duct portion, 30, 130, 530, 630, 730: dissipative LED attachment portion (dissipative light source attachment portion), 30a, 130a: heat dissipation portion (one part), 30b, 130b: LED attachment portion (another part), 31, 131: fan (blower), 31a: blowing port, 37, 337: composite plate, 38: resin core, 39, 139: metal plate, 40: metal plate, 41: light reflecting plate, 42: thermal conductive member, 44: composite plate, 45: resin core, 46: metal plate, 47: metal plate, TV: television device

The invention claimed is:

1. A lighting device, comprising:
    a chassis including a light exit portion through which light exits;
    a light source arranged close to an end portion of the chassis;
    a light guide member arranged closer to a middle area of the chassis than the light source and configured to guide light from the light source toward a light exit portion side;
    a duct member arranged on a side of the chassis opposite to the light exit portion side and having an air passage therein, the duct member being formed of a composite plate including a resin core having a plate-like shape and a pair of metal plates arranged so as to sandwich the resin core from a front side and a rear side; and a dissipative light source attachment portion provided on the duct member and including one part facing the air passage, and another part protruding to inside of the chassis and to which the light source is attached.

2. The lighting device according to claim 1, wherein the duct member includes:

a bottom wall opposite the chassis; and at least a pair of sidewalls protruding from the bottom wall toward the chassis and facing each other, wherein the air passage is a space surrounded and defined by the bottom wall, the at least a pair of sidewalls, and the chassis.

3. The lighting device according to claim 2, wherein the chassis is formed of a light reflecting plate made of synthetic resin and including a surface having a white color.

4. The lighting device according to claim 3, wherein the chassis is formed of the light reflecting plate made of foamed resin material.

5. The lighting device according to claim 2, wherein the chassis is formed of a composite plate including a resin core having a plate-like shape and a pair of metal plates arranged so as to sandwich the resin core from a front side and a rear side.

6. The lighting device according to claim 5, wherein the duct member covers a part of the chassis, and the lighting device further comprising a light source drive board provided on a side of the chassis that is opposite to the light exit portion side and adjacent to the duct member, the light source drive board being configured to provide drive power to the light source.

7. The lighting device according to claim 1 further comprising a blower mounted to a portion of the duct member, the blower including a blowing port that is opposite a part of the dissipative light source attachment portion and through which air flows to the air passage.

8. The lighting device according to claim 7, further comprising a thermal conductive member that is arranged between the light source and the dissipative light source attachment portion and having relatively higher thermal conductivity than the duct member.

9. The lighting device according to claim 8, wherein the thermal conductive member extends to the one part of the dissipative light source attachment portion that faces the air passage.

10. A display device, comprising:

the lighting device according to claim 1; and a display panel configured to provide display using light from the lighting device.

11. The display device according to claim 10, wherein the display panel is a liquid crystal panel including a pair of substrates and liquid crystals enclosed therebetween.

12. A television device comprising the display device according to claim 10.

* * * * *